(12) United States Patent
Shibahara et al.

(10) Patent No.: US 12,395,248 B2
(45) Date of Patent: Aug. 19, 2025

(54) SIGNAL DETECTOR, CARRIER PHASE RETRIEVAL APPARATUS, CARRIER PHASE RETRIEVAL METHOD AND CARRIER PHASE RETRIEVAL PROGRAM

(71) Applicant: NIPPON TELEGRAPH AND TELEPHONE CORPORATION, Tokyo (JP)

(72) Inventors: Koki Shibahara, Musashino (JP); Takayuki Mizuno, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 134 days.

(21) Appl. No.: 18/038,664

(22) PCT Filed: Dec. 21, 2020

(86) PCT No.: PCT/JP2020/047752
§ 371 (c)(1),
(2) Date: May 24, 2023

(87) PCT Pub. No.: WO2022/137299
PCT Pub. Date: Jun. 30, 2022

(65) Prior Publication Data
US 2023/0421267 A1 Dec. 28, 2023

(51) Int. Cl.
  *H04B 10/61* (2013.01)
  *H04B 10/2581* (2013.01)
  *H04J 14/00* (2006.01)
(52) U.S. Cl.
  CPC ..... *H04B 10/6165* (2013.01); *H04B 10/2581* (2013.01); *H04J 14/05* (2023.08)

(58) Field of Classification Search
  CPC .................................................. H04B 10/2582
  See application file for complete search history.

(56) References Cited

U.S. PATENT DOCUMENTS

| 2013/0077967 A1* | 3/2013 | Woodward | ......... H04B 10/5053 398/44 |
| 2013/0230311 A1* | 9/2013 | Bai | .................... H04B 10/2581 398/9 |

(Continued)

FOREIGN PATENT DOCUMENTS

| CN | 109639606 A | 4/2019 |
| JP | 2020141294 A | 9/2020 |
| WO | WO-2015052895 A1 | 4/2015 |

OTHER PUBLICATIONS

Lalitha Pakala et al., "Extended Kalman filtering for joint mitigation of phase and amplitude noise in coherent QAM systems", Optics Express, vol. 24, No. 6, pp. 6391-6401, Mar. 2016.

(Continued)

*Primary Examiner* — Nathan M Cors
(74) *Attorney, Agent, or Firm* — Harness, Dickey & Pierce, P.L.C.

(57) ABSTRACT

An interference component generated because a plurality of carrier generation units and a plurality of local oscillation units are asynchronous is used as state information, a predetermined state equation for calculating posterior state information on the basis of prior state information, and a transmission data sequence are used as observation information, a Kalman filter algorithm is applied to a predetermined observation equation for calculating the observation information in a state indicated by the posterior state information on the basis of the posterior state information calculated by the state equation, a reception data sequence, and a weight matrix to calculate a posterior state estimate of the interference component, and an estimated sequence of the (Continued)

transmission data sequence from which the interference component has been removed is calculated on the basis of the calculated posterior state estimate.

6 Claims, 12 Drawing Sheets

(56) References Cited

U.S. PATENT DOCUMENTS

| | | | |
|---|---|---|---|
| 2015/0229438 A1* | 8/2015 | Le Taillandier De Gabory | H04B 10/2581 398/182 |
| 2022/0149974 A1 | 5/2022 | Kobayashi et al. | |
| 2024/0267097 A1* | 8/2024 | Ashrafi | H04L 27/34 |

OTHER PUBLICATIONS

Timo Pfau et al., "Hardware-Efficient Coherent Digital Receiver Concept With Feedforward Carrier Recovery for M-QAM Constellations", Journal of Lightwave Technology, vol. 27, No. 8, pp. 989-999, Apr. 2009.

* cited by examiner

SIGNAL DETECTOR, CARRIER PHASE RETRIEVAL APPARATUS, CARRIER PHASE RETRIEVAL METHOD AND CARRIER PHASE RETRIEVAL PROGRAM

CROSS-REFERENCE TO RELATED APPLICATIONS

This application is a 371 U.S. National Phase of International Application No. PCT/JP2020/047752, filed on Dec. 21, 2020. The entire disclosure of the above application is incorporated herein by reference.

TECHNICAL FIELD

The present invention relates to a signal detection device, a carrier phase recovery device, a carrier phase recovery method, and a carrier phase recovery program.

BACKGROUND ART

With the recent start of 5th generation (5G) services, distribution of high definition moving picture services, enhancement of Internet of Things (IoT) services, and the like, communication traffic flowing through optical networks has been increasing year by year. As countermeasures to the increasing communication traffic demands in optical networks, for example, countermeasures such as improvement of functions of optical communication system apparatuses installed at terminal stations of optical networks and introduction of optical amplifiers and optical switches without changing the structure of optical fibers as transmission lines have been taken.

A single mode fiber is used as an optical fiber that is a base of current large capacity optical networks excluding local networks for short distances such as local area networks (LANs). The single mode fiber has a single core serving as a path for an optical signal in a clad and is an optical fiber that permits only single mode propagation in wavelength bands such as a C band and an L band used in large capacity optical networks. Accordingly, a large capacity optical network for stably transmitting a large amount of information reaching several terabits per second over a long distance is realized.

A digital coherent transmission technology using a digital signal processing technology and a coherent transmission/reception technology has been commercially introduced into an optical communication system of 100 gigabits per second. The digital coherent transmission technology is a technology in which a coherent reception method and ultra-high-speed digital signal processing are combined. The coherent reception method is a reception method for detecting coherent light between light on a reception side and local oscillation light. The ultra-high-speed digital signal processing is processing for removing noise of phase components caused by frequency and phase fluctuations in a transmission-side light source for generating signal light and a reception-side light source for generating local oscillation light after digitalizing a signal.

According to the digital coherent transmission technology, a small-sized, inexpensive optical transmission/reception module with low power consumption and an optical transceiver using the same are realized without using a complicated phase locked circuit or the like. With the advent of digital coherent transmission technology, it is possible not only to improve reception sensitivity at the time of optical transmission constituting a large capacity optical network but also to remarkably enhance information transmission efficiency by loading information on the amplitude, phase and polarized waves of optical carriers.

As an example of a transmission method using the digital coherent transmission technology in optical transmission systems, there is polarization multiplexing optical transmission using two orthogonal polarization modes for a single mode fiber. In polarization multiplexing optical transmission, different types of information can be loaded on polarized waves orthogonal to each other. When polarization multiplexing optical transmission is performed, polarized waves having an orthogonal relation are mixed complicatedly in an optical transmission line, and an orthogonal axis of a polarization mode fluctuates at a high speed. Accordingly, it is difficult to follow such a polarized wave using an optical device. Therefore, a reception device compatible with a polarization diversity structure receives mixed polarization multiplexed optical signals, converts the received polarization multiplexed optical signals into digital signals, and performs processing for separating the digital signals using digital signal processing. Such processing can be modeled as a "2×2 Multiple-Input Multiple-Output (MIMO)" system used in wireless communication systems. Accordingly, information for each polarization can be extracted from a separated signal, and communication between a transmitter and a receiver is established.

As another example of a transmission method using the digital coherent transmission technology, there is mode multiplexed optical transmission using a plurality of spatial modes (hereinafter referred to as "modes") in a multi-mode optical fiber. In mode multiplexed optical transmission, a core diameter can be increased as compared to a single mode fiber. Accordingly, a plurality of modes can be excited even in an existing wavelength band such as a C band, and different types of information can be loaded on respective modes. Even in the case of mode multiplexed optical transmission, mode multiplexed optical signals are mixed complicatedly during propagation through a multi-mode optical fiber, as in the case of polarization multiplexing optical transmission. A reception device compatible with the mode diversity structure receives mixed mode multiplexed optical signals, converts the received mode multiplexed optical signals into digital signals, and separates the digital signals using MIMO digital signal processing of a scale corresponding to the number of excited modes.

As a more specific example, a few-mode fiber, which excites two linear polarized (2LP) modes, may be conceived. In the few-mode fiber for the 2LP modes, an LP01 mode that is a base mode and an LP11 mode that is a high-order mode are excited. Further, by utilizing 2 degenerate modes (which are referred to as LP11a and LP11b) of the LP11 mode, and polarization modes (which are referred to as X polarization and Y polarization) of each mode, it is possible to load different types of information in a total of six spatial modes, LP01X, LP01Y, LP11aX, LP11aY, LP11bX, and LP11bY in the few-mode fiber for the 2LP modes. Therefore, if the nonlinear optical effect of optical fibers is ignored, the few-mode fiber for the 2 LP modes can achieve a transmission capacity three times that of the conventional single-mode fiber in principle.

In realizing future high-capacity optical backbone networks, it is indispensable to establish a space division multiplexing transmission technology infrastructure in which information is loaded on propagating light in the aforementioned multi-mode optical fiber. However, it has been said that there are many unexamined parts of a light source and its peripheral circuit configuration in a coherent transmission/reception circuit to which the above-mentioned digital coherent transmission technology is applied. In particular, in reports on space division multiplexing transmission experiments at the laboratory level at the present time, there is a situation that synchronization of phases and frequencies between light sources is implicitly assumed with respect to the light sources in a coherent transmission/reception circuit.

In a coherent transmission/reception circuit in a transmission system using an existing single mode fiber as a transmission medium, since light sources between transmission and reception are generally asynchronous, a phase noise component and a frequency offset component are added to a received signal and thus these components need to be removed. As a typical algorithm used for this removal, for example, an extended Kalman filter type phase amplitude correction method described in Non Patent Literature 1 and a blind phase search (BPS) method described in Non Patent Literature 2 are known. However, the former extended Kalman filter type phase amplitude correction method is designed for single mode transmission and thus cannot be applied to space division multiplexing transmission. The latter BPS method can be extended to space division multiplexing transmission in principle but cannot be applied to space division multiplexing transmission from the viewpoint of implementation because the number of combinations of test phases exponentially increases according to the number of asynchronous light sources.

CITATION LIST

Non Patent Literature

[NPL 1] Lalitha Pakala et al., "Extended Kalman filtering for Joint mitigation of phase and amplitude noise in coherent QAM systems," Optics Express, Vol. 24 Issue 6, pp. 6391-6401, March 2016
[NPL 2] Timo Pfau et al., "Hardware-efficient coherent digital receiver concept with feedforward carrier recovery for M-QAM constellations," Journal of Lightwave Technology, vol. 27, Issue 8, pp. 989-999, April 2009

SUMMARY OF INVENTION

Technical Problem

Securing synchronization of phases and frequencies between light sources can be realized by methods such as a method of branching output light from a single light source and optically amplifying it and injection synchronization. However, addition of a new monitor mechanism required for securing predetermined requirements for synchronization and the like may cause problems such as an increase in the size of a device and an increase in power consumption. There is a concern that an increase in device manufacturing costs may be caused by change in an existing wafer manufacturing process for a wavelength variable semiconductor light source for a wavelength multiplexing system.

In view of the aforementioned circumstances, an object of the present invention is to provide a technology capable of transmitting a plurality of signals using the same transmission medium in a state in which a carrier generated by a transmission device and a local oscillation signal generated by a reception device are asynchronous.

Solution to Problem

An aspect of the present invention is a signal detection device included in a reception device in a communication system including: a transmission device including a plurality of transmission units that modulate carriers output by carrier generation units included in the transmission units on the basis of transmission data sequences provided to the transmission units to generate transmission signals, and transmit the generated transmission signals to a transmission line for transmitting a plurality of signals; and the reception device including a plurality of reception units that receive the plurality of signals transmitted through the transmission line and demodulate the received reception signals on the basis of local oscillation signals output by local oscillation units included in the reception units to generate reception data sequences, the signal detection device including: a weight matrix calculation unit configured to calculate a weight matrix used at the time of performing MIMO linear reception on the reception data sequences; and a carrier phase recovery unit configured to use an interference component generated because the plurality of carrier generation units and the plurality of local oscillation units are asynchronous as state information, to use a predetermined state equation for calculating posterior state information on the basis of prior state information, and the transmission data sequences as observation information, to apply a Kalman filter algorithm to a predetermined observation equation for calculating the observation information in a state indicated by the posterior state information on the basis of the posterior state information calculated by the state equation, the reception data sequences, and the weight matrix to calculate a posterior state estimate of the interference component, and to calculate estimated sequences of the transmission data sequences from which the interference component has been removed on the basis of the calculated posterior state estimate.

An aspect of the present invention is a carrier phase recovery device including the aforementioned signal detection device as a device.

An aspect of the present invention is a carrier phase recovery method performed by a reception device in a communication system including: a transmission device including a plurality of transmission units that modulate carriers output by carrier generation units included in the transmission units on the basis of transmission data sequences provided to the transmission units to generate transmission signals, and transmit the generated transmission signals to a transmission line for transmitting a plurality of signals; and the reception device including a plurality of reception units that receive the plurality of signals transmitted through the transmission line and demodulate the received reception signals on the basis of local oscillation signals output by local oscillation units included in the reception units to generate reception data sequences, the carrier phase recovery method including: calculating a weight matrix used at the time of performing MIMO linear reception on the received data sequences; using an interference component generated because the plurality of carrier generation units and the plurality of local oscillation units are asynchronous as state information, using a predetermined state equation for calculating posterior state information on the basis of prior state information, and the transmission data sequences as observation information, and applying a Kalman filter algorithm to a predetermined observation equation for calculating the observation information in a state indicated by the posterior state information on the basis of the posterior state information calculated by the state equation, the reception data sequences, and the weight matrix to calculate a posterior state estimate of the interference component; and calculating estimated sequences of the transmission data sequences from which the interference component has been removed on the basis of the calculated posterior state estimate.

An aspect of the present invention is a carrier phase recovery program causing a computer to serve as the carrier phase recovery device.

Advantageous Effects of Invention

According to the present invention, it is possible to transmit a plurality of signals using the same transmission medium in a state in which a carrier generated by a transmission device and a local oscillation signal generated by a reception device are asynchronous.

DESCRIPTION OF EMBODIMENTS

First Embodiment

Figure 1:
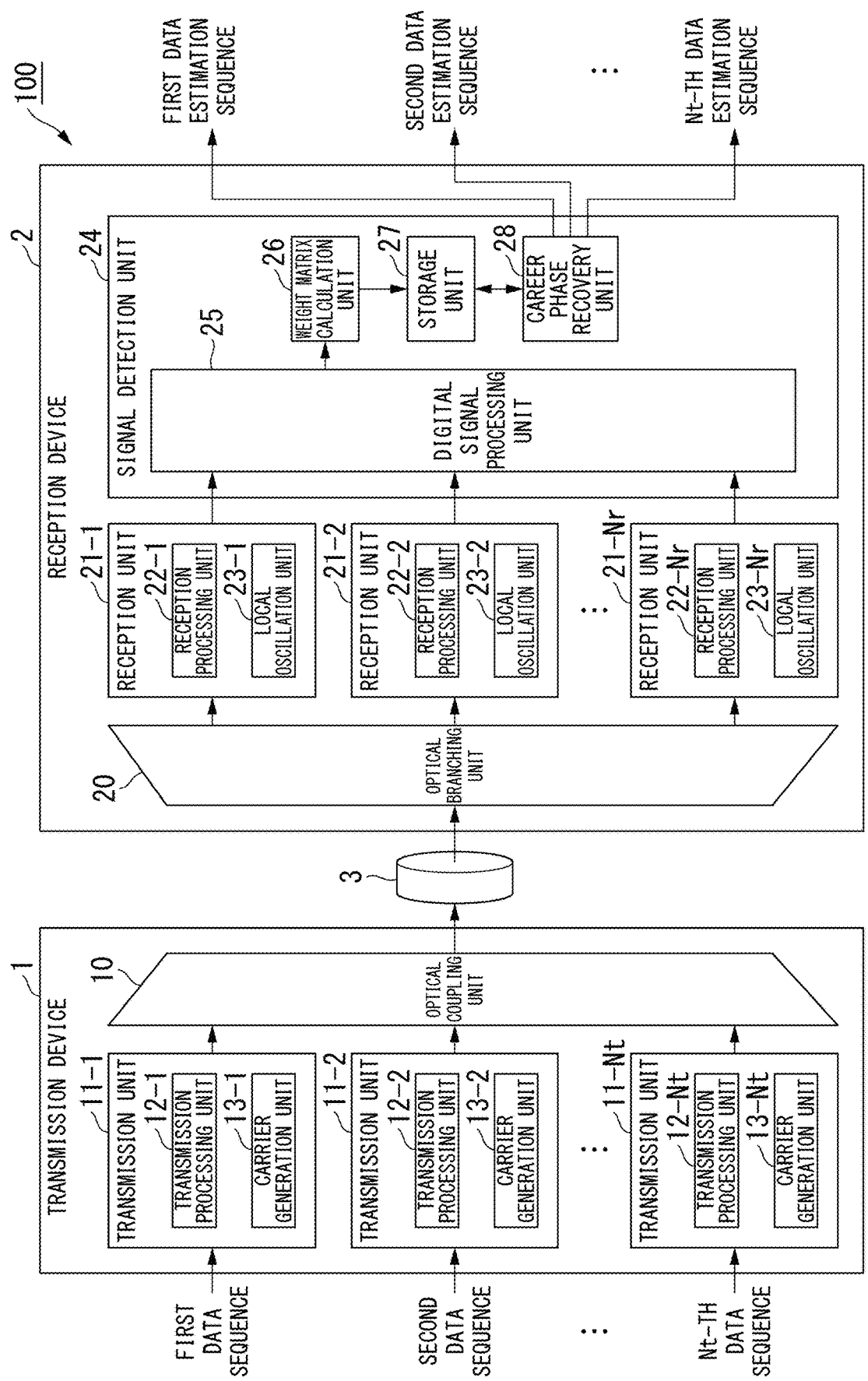
FIG. 1 is a block diagram showing a configuration of a communication system of a first embodiment.

Hereinafter, a first embodiment of the present invention will be described with reference to the drawings. FIG. 1 is a block diagram showing a configuration of a communication system 100 of the first embodiment. The communication system 100 includes a transmission device 1, a reception device 2, and a transmission line 3 that connects the transmission device 1 and the reception device 2. The transmission line 3 is, for example, a multi-mode optical fiber and transmits optical signals of a plurality of spatial modes.

The transmission device 1 includes Nt transmission units (transmitters) 11-1 to 11-Nt and an optical coupling unit 10. Here, Nt is an integer equal to or greater than 2. The transmission unit 11-1 includes a transmission processing unit 12-1 and a carrier generation unit 13-1. The transmission units 11-2 to 11-Nt respectively include transmission processing units 12-2 to 12-Nt and carrier generation units (carrier generators) 13-2 to 13-Nt corresponding to the branch numbers of the reference signs.

Each of the carrier generation units 13-1 to 13-Nt generates a carrier. In the first embodiment, signal light sources are applied as the carrier generation units 13-1 to 13-Nt, and each of the carrier generation units 13-1 to 13-Nt emits continuous light serving as a carrier. Each of the transmission processing units 12-1 to 12-Nt fetches a data sequence that is a sequence of independent information as a transmission data sequence. In the following description, transmission data sequences fetched by the transmission processing units 12-1, 12-2, . . . , 12-Nt are referred to as a first data sequence, a second data sequence, . . . , an Nt-th data sequence, and a vector having Nt transmission data sequences of the first data sequence to the Nt-th data sequence as elements is referred to as a transmission signal vector x.

The transmission processing units 12-1 to 12-Nt respectively encode the first data sequence to the Nt-th data sequence fetched thereby. Each of the transmission processing units 12-1 to 12-Nt includes an optical modulator thereinside. The respective transmission processing units 12-1 to 12-Nt generate optical signals from transmission data sequences by using the first data sequence to the Nt-th data sequence of electrical signals encoded thereby using the internal optical modulators as modulation signals and modulating continuous light of carriers emitted from the carrier generation units 13-1 to 13-Nt corresponding thereto.

More specifically, the electrical signals of the first data sequence to the Nt-th data sequence encoded by the transmission processing units 12-1 to 12-Nt are applied to electrical inputs of the optical modulators provided in the transmission processing units 12-1 to 12-Nt. The continuous light of carriers emitted by the carrier generation units 13-1 to 13-Nt corresponding to the transmission processing units 12-1 to 12-Nt is applied to optical inputs of the optical modulators provided in the transmission processing units 12-1 to 12-Nt. Here, in order to obtain synchronized continuous light of Nt sequences, a method of optically branching and optically amplifying a single ray of continuous light as a continuous light to be provided to an optical modulator provided in each of the transmission processing units 12-1 to 12-Nt, a method of performing injection synchronization, or the like is adopted in general. On the other hand, in the transmission device 1 of the first embodiment, such a configuration in which such a synchronization method is performed is not required and continuous light of carriers emitted by the carrier generation units 13-1 to 13-Nt may be in an asynchronous state.

The optical coupling unit 10 couples Nt optical signals generated by the transmission processing units 12-1 to 12-Nt and sends the coupled optical signals to the transmission line 3. The transmission line 3 transmits the Nt optical signals to the reception device 2 as optical signals of respective spatial modes.

The reception device 2 includes an optical branching unit 20, Nr reception units (receptors) 21-1 to 21-Nr, and a signal detection unit 24. Here, Nr is an integer equal to or greater than 2. The optical signals of respective spatial modes propagating through the transmission line 3 are mixed while propagating through the transmission line 3. The optical branching unit 20 branches optical signals in which the optical signals of the respective spatial modes are mixed into Nr optical signals.

The reception unit 21-1 includes a reception processing unit 22-1 and a local oscillation unit (local oscillator) 23-1, and similarly, the reception units 21-2 to 21-Nr respectively include reception processing units 22-2 to 22-Nr and local oscillation units (local oscillators) 23-2 to 23-Nr corresponding to the branch numbers of the reference signs. Each of the local oscillation units 23-1 to 23-Nr generates and outputs a local oscillation signal used for demodulation. In the first embodiment, local oscillation light sources are applied as the local oscillation units 23-1 to 23-Nr, and each of the local oscillation units 23-1 to 23-Nr emits continuous light used for coherent detection as a local oscillation signal.

Each of the reception processing units 22-1 to 22-Nr includes a demodulator for performing coherent detection thereinside. The respective reception processing units 22-1 to 22-Nr provide continuous light emitted from the local oscillation units 23-1 to 23-Nr to the demodulators provided there and perform coherent detection on optical signals output from the optical branching unit 20 to the respective reception processing units 22-1 to 22-Nr to demodulate the optical signals to generate reception data sequences of electrical signals.

Here, when the number of modes of optical signals transmitted by the transmission line 3 is "Nm," a relationship among the number Nt of transmission units 11-1 to 11-Nt, the number Nr of reception units 21-1 to 21-Nr of the reception device 2, and Nm is Nt≤Nr≤Nm. The number Nm of modes to be used as independent signal transmission modes is predetermined by a user such that Nt≤Nm and Nr≤Nm are satisfied. Since Nt≤Nm and Nr≤Nm, in general, in MIMO communication, the relationship of Nt≤Nr≤Nm, which is the aforementioned condition, is established. Even if Nm or less modes are excited in the transmission device 1, light in all modes may be excited due to fiber incompleteness such as bending, twisting and microbending of an optical fiber. In such a case, it is desirable to set Nr=Nm in order to perform satisfactory reception by MIMO.

The signal detection unit 24 includes a digital signal processing unit 25, a weight matrix calculation unit (weight matrix calculator) 26, a storage unit 27, and a carrier phase recovery unit (carrier phase recoverer) 28. The digital signal processing unit 25 performs the following digital signal processing on Nr reception data sequences generated by the reception processing units 22-1 to 22-Nr. The digital signal processing unit 25 removes distortion or the like generated in the waveform of each of the Nr reception data sequences due to transmission through the transmission line 3 by digital signal processing. The digital signal processing unit 25 corrects an error generated in each of the Nr reception data sequences due to transmission through the transmission line 3 by digital signal processing. Accordingly, the Nr reception data sequences can be separated, and Nt transmission data sequences can be estimated on the basis of the separated Nr reception data sequences. Hereinafter, a vector having the Nr reception data sequences output after subjected to digital signal processing performed by the digital signal processing unit 25 as elements is referred to as a reception signal vector y.

The weight matrix calculation unit 26 calculates a weight matrix W which is necessary at the time of using a minimum mean square error (MMSE) method which is a method of performing signal separation on the reception signal vector y subjected to digital signal processing performed by the digital signal processing unit 25.

Figure 2:
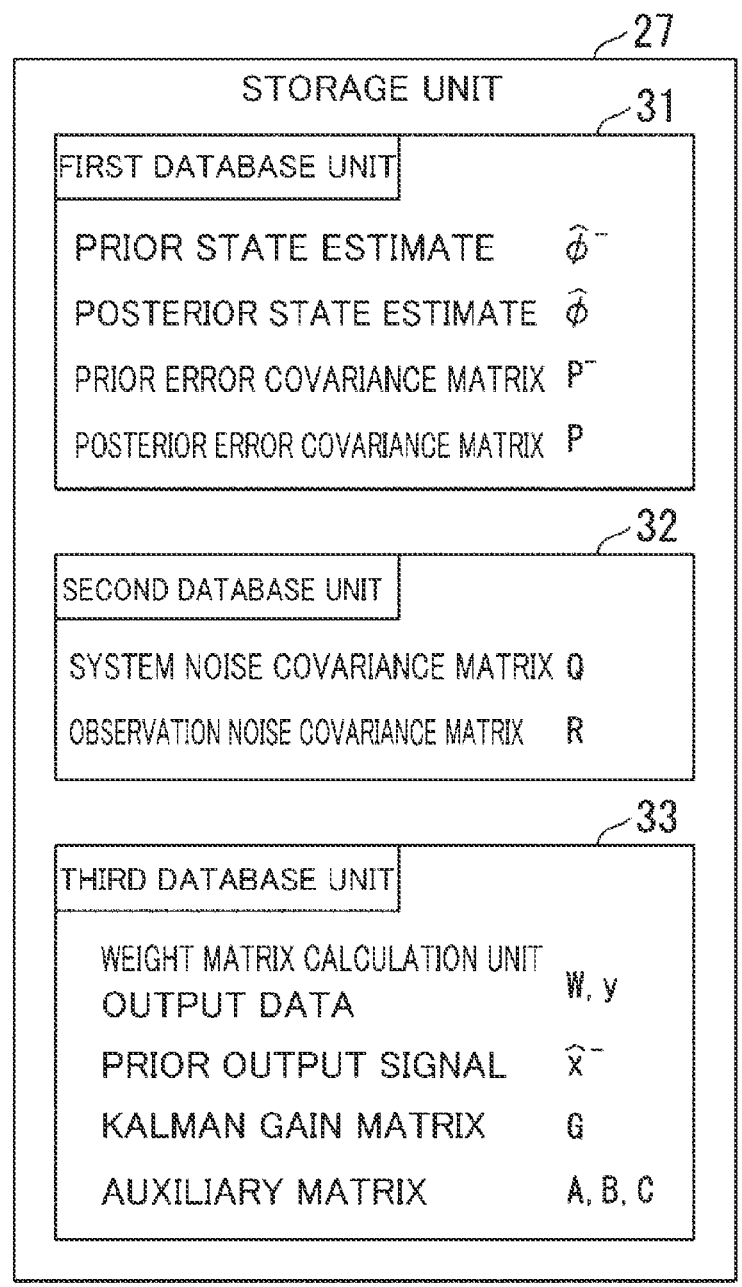
FIG. 2 is a diagram showing data configurations of a first database unit, a second database unit, and a third database unit included in a storage unit of the first embodiment.

As shown in FIG. 2, the storage unit 27 includes a first database unit 31, a second database unit 32, and a third database unit 33. The first database unit 31 stores a prior state estimate, a posterior state estimate, a prior error covariance matrix $P^-$, and a posterior error covariance matrix P. The prior state estimation value and the posterior state estimation value are vectors and are represented as the following formulas (1) and (2).

[Math. 1]

$$\hat{\varphi}^- \qquad (1)$$

[Math. 2]

$$\hat{\varphi} \qquad (2)$$

Hereinafter, in the text, a symbol representing the prior state estimation value of formula (1) is described as a vector $\hat{\varphi}^-$, and a symbol representing the posterior state estimation value of formula (2) is described as a vector $\hat{\varphi}$.

The second database unit 32 stores a system noise covariance matrix Q and an observation noise covariance matrix R.

The third database unit 33 stores weight matrix calculation unit output data, a prior output signal, a Kalman gain matrix G, an auxiliary matrix A, an auxiliary matrix B, and an auxiliary matrix C. The weight matrix calculation unit output data is data written by the weight matrix calculation unit 26 and includes the weight matrix W and the reception signal vector y.

The prior output signal is a vector and is represented by the following formula (3). In the text, a symbol representing the prior output signal of the following formula (3) is described as a vector $\hat{x}^-$.

[Math. 3]

$$\hat{x}^- \qquad (3)$$

When a variable indicating a sampling time is k, vectors and matrices excluding the system noise covariance matrix Q and the observation noise covariance matrix R among vectors and matrices stored in the first database unit 31, the second database unit 32, and the third database unit 33 in the storage unit 27 are correctly notated when the variable k indicating the sampling time corresponding thereto is added to each of them, the variable k is not added in FIG. 2. Here, although the variable k is a natural number, the value of the variable k may be "0" when a predetermined initial value is shown in the following.

The carrier phase recovery unit 28 estimates an interference component caused by phase fluctuation of the carrier generation units 13-1 to 13-Nt and an interference component caused by phase fluctuation of the local oscillation units 23-1 to 23-Nr. The carrier phase recovery unit 28 calculates an estimated sequence of the transmission signal vector x from which the estimated two interference components have been removed.

In the first embodiment, the carrier phase recovery unit 28 estimates, as two interference components, a phase noise component caused by phase fluctuation of a light source of each of the carrier generation units 13-1 to 13-Nt and a phase noise component caused by phase fluctuation of a light source of each of the local oscillation unit 23-1 to 23-Nr.

Here, it is assumed that phase noise components caused by phase fluctuations of the light sources of the respective carrier generation units 13-1 to 13-Nt are $\varphi_1^t, \varphi_2^t, \ldots, \varphi_{Nt}^t$, and phase noise components caused by phase fluctuations of the light sources of the respective local oscillation units 23-1 to 23-Nr are $\varphi_1^r, \varphi_2^r, \ldots, \varphi_{Nr}^r$. A phase noise component vector $\varphi^t$ that is a column vector having the phase noise components $\varphi_1^t, \varphi_2^t, \ldots, \varphi_{Nt}^t$ caused by phase fluctuations of the light sources of the respective carrier generation units 13-1 to 13-Nt is defined as the following formula (4).

[Math. 4]

$$\phi^t \triangleq \begin{pmatrix} \phi_1^t \\ \vdots \\ \phi_{N_t}^t \end{pmatrix} \quad (4)$$

A phase noise component vector $\varphi^r$ that is a column vector having the phase noise components $\varphi_1^r, \varphi_2^r, \ldots, \varphi_{Nr}^r$ caused by phase fluctuations of the light sources of the respective local oscillation units 23-1 to 23-Nr is defined as the following formula (5).

[Math. 5]

$$\phi^r \triangleq \begin{pmatrix} \phi_1^r \\ \vdots \\ \phi_{N_r}^r \end{pmatrix} \quad (5)$$

Although the suffixes "t" and "r" of "Nt" and "Nr" are not denoted as subscripts in the text, it is assumed that the suffixes "t" and "r" of "Nt" and "Nr" are denoted as subscripts in mathematical expressions, as shown in formulas (4) and (5), from the viewpoint of visibility, and the same applies to the following mathematical expressions.

Here, a vector $\theta^t$ calculated from the phase noise component vector $\varphi^t$ and a vector $\theta^r$ calculated from the phase noise component vector $\varphi^r$ are defined as the following formulas (6) and (7).

[Math. 6]

$$\theta^t \triangleq \begin{pmatrix} e^{j\phi_1^t} \\ \vdots \\ e^{j\phi_{N_t}^t} \end{pmatrix} \quad (6)$$

[Math. 7]

$$\theta^r \triangleq \begin{pmatrix} e^{j\phi_1^r} \\ \vdots \\ e^{j\phi_{N_r}^r} \end{pmatrix} \quad (7)$$

A matrix $D_t$ obtained by arranging elements of the vector $\theta^t$ of formula (6) as diagonal elements is defined as the following formula (8), and a matrix $D_r$ obtained by arranging elements of the vector $\theta^r$ of formula (7) as diagonal elements is defined as the following formula (9).

[Math. 8]

$$D_t = \mathrm{diag}(\theta^t) \quad (8)$$

[Math. 9]

$$D_r = \mathrm{diag}(\theta^r) \quad (9)$$

The transmission signal vector x is defined as the following formula (10), and the reception signal vector y is defined as the following formula (11).

[Math. 10]

$$x = [x_1, x_2, \ldots x_{N_t}]^T \quad (10)$$

[Math. 11]

$$y = [y_1, y_2, \ldots y_{N_r}]^T \quad (11)$$

A noise vector z obtained by summing up noises added until the reception signal vector y is obtained, that is, noises added by transmission/reception circuits such as the transmission line 3 that is a communication path, the transmission processing units 12-1 to 12-Nt of the transmission device 1, the reception processing units 22-1 to 22-Nt of the reception device 2, and the digital signal processing unit 25 of the reception device 2, is defined as the following formula (12).

[Math. 12]

$$z = [z_1, z_2, \ldots z_{N_r}]^T \quad (12)$$

A communication path matrix of the transmission line 3 is defined as a communication path matrix H which is a matrix having a size of Nr rows and Nt columns. In this case, a relationship represented by the following formula (13) is established.

[Math. 13]

$$y = \begin{pmatrix} e^{j\phi_1^r} & & & \\ & e^{j\phi_2^r} & & \\ & & \ddots & \\ & & & e^{j\phi_{N_r}^r} \end{pmatrix} H \begin{pmatrix} e^{j\phi_1^t} & & & \\ & e^{j\phi_2^t} & & \\ & & \ddots & \\ & & & e^{j\phi_{N_t}^t} \end{pmatrix} x + z \quad (13)$$

$$= D_r H D_t x + z$$

The values of elements included in the vectors and matrices represented by formula (13) are values that change at each sampling time, and they are correctly notated when the variable k indicating the sampling time is added thereto, but in this case, the values are simply indicated without adding k thereto for visibility. In description of the following mathematical expressions, it is assumed that the variable k indicating the sampling time may be omitted if it is obvious from the contents of the mathematical expressions that the variable k is added.

The purpose of MIMO linear reception using the weight matrix W calculated by the weight matrix calculation unit 26 is to virtually uncouple coupling between spatial channels in the communication path, that is, the transmission line 3 to obtain estimated sequences of Nt transmission data sequences by multiplying the reception signal vector y subjected to digital signal processing performed by the digital signal processing unit 25 by the weight matrix W. On the other hand, the purpose of processing performed by the carrier phase recovery unit 28 is to estimate a phase noise component vector $\varphi$, which is a column vector having (Nt+Nr) rows in which the phase noise component vector $\varphi^t$ and the phase noise component vector $\varphi^r$ are vertically arranged, for each sampling time and to additionally remove the phase noise component vector $\varphi$ estimated from estimated sequences of the Nt transmission data sequences obtained by MIMO linear reception.

The carrier phase recovery unit 28 performs processing of estimating the phase noise component vector φ for each sampling time on the basis of observation information obtained for each state by applying a Kalman filter algorithm to a predefined observation equation and a state equation. Hereinafter, an observation equation and a state equation which need to be predefined when the Kalman filter algorithm is used will be described.

When a general MMSE method is applied as a design standard of the weight matrix W calculated by the weight matrix calculation unit 26, if the communication path matrix H is not a unitary matrix, the influence between spatial channels cannot be completely removed by multiplication of the weight matrix W and thus interference components remain. The remaining interference components and the noise vector z can be integrally represented as the following formula (14).

[Math. 14]

$$\tilde{z} \triangleq -\frac{1}{\gamma} D_t^H F^{-1} D_t x + D_t^H W^H D_r^H z \tag{14}$$

Hereinafter, the symbol of the left side of formula (14) is denoted as ~z in the text. In formula (14), γ is a signal-to-noise ratio after propagation through the transmission line 3, and the matrix F is a matrix defined by the following formula (15). In formula (15), $I_{N_t}$ is a unit matrix having N rows and N columns.

[Math. 15]

$$F \triangleq H^H H + \frac{1}{\gamma} I_{N_t} \tag{15}$$

In order to obtain an estimated sequence of the transmission signal vector x from the reception signal vector y, it is necessary to perform an operation of multiplying a matrix $D_t^H$ which is a rotation operation for a phase shift caused by the carrier generation units 13-1 to 13-Nt and an operation of multiplying a vector $\theta^{r*}$ which is a rotation operation for a phase shift caused by the local oscillation units 23-1 to 23-Nr on the basis of the phase noise component vector φ estimated by the carrier phase recovery unit 28, and then remove ~z. This relationship can be represented by the following formula (16).

[Math. 16]

$$D_t^H W^H \mathrm{diag}(y)\theta^{r*} = x + \tilde{z} \tag{16}$$

Formula (16) can be called an observation equation having an estimated sequence of the transmission signal vector x as observation information and having ~z as observation noise.

In order to simplify the representation of the observation equation, a nonlinear function h(φ) represented by the following formula (17) is defined.

[Math. 17]

$$h(\phi) \triangleq D_t^H W^H \mathrm{diag}(y)\theta^{r*} \tag{17}$$

The observation equation of formula (16) can be represented as the following formula (18) using the nonlinear function h(T) of formula (17).

[Math. 18]

$$h(\phi) = x + \tilde{z} \tag{18}$$

The state equation related to the phase noise component vector φ estimated by the carrier phase recovery unit 28 can be expressed as the following formula (19).

[Math. 19]

$$\phi(k+1) = \phi(k) + v(k) \tag{19}$$

In formula (19), the vector v(k) is a vector having (Nt+Nr) rows. Here, in consideration of characteristics of coherent detection performed by the reception units 21-1 to 21-Nr, one specific component among the components of the phase noise component vector φ is used as a steady value, that is, a reference angle. The reason why specific one of the components of the phase noise component vector φ is used as the reference angle in this manner is to limit a plurality of least square solutions to a specific solution. A method of selecting specific one component may be arbitrarily determined. Here, $\phi_1^t$ is selected as a phase noise component to be a reference angle from the phase noise components $\phi_1^t, \phi_2^t, \ldots, \phi_{Nt}^t$ caused by phase fluctuations of the respective carrier generation units 13-1 to 13-Nt of the transmission side, and additionally, it is assumed that $\phi_1^t = 0$ such that generality is not lost. The reason why the reference angle is set to "0" is that, when a signal modulated by a modulation method such as quadrature phase shift keying (QPSK) is transmitted, for example, minimum square solutions for other unknown numbers are expected to be meaningful solutions in communication by setting the reference angle to "0". In this case, the vector v(k) can be expressed as the following formula (20).

[Math. 20]

$$v(k) = \begin{bmatrix} 0 \\ v_2(k) \\ \vdots \\ v_{N_t+N_r}(k) \end{bmatrix} \tag{20}$$

As shown in the aforementioned formula (20), the first element $v_1(k)$ of the vector v(k) is "0" because it is the reference angle, and the remaining (Nt+Nr−1) elements $v_2(k)$ to $v_{N_t+N_r}(k)$ are white noise having an average of 0 and a dispersion of 2τΔvT. Here, Δv is the line width of the carrier generation units 13-1 to 13-Nt and the local oscillation units 23-1 to 23-Nr, and T is a sampling period.

The Kalman filter algorithm based on the observation equation represented by formula (18) and the state equation represented by formula (19) is an algorithm that repeats a series of operations such as 1. Prior state estimate update, 2. Prior miscalculation covariance update, 3. Kalman gain update, 4. Posterior state estimate update, 5. Posterior error covariance update, 6. Signal output value The operation of "1. Prior state estimate update" is expressed by formula (21).

[Math. 21]

$$\hat{\phi}^-(k) = \hat{\phi}(k-1) \tag{21}$$

In the aforementioned formula (21), the vector $\hat{\phi}^-(k)$ is a prior state estimate represented by formula (1) when the sampling time is (k), and the vector $\hat{\phi}^-(k-1)$ is a posterior state estimate represented by formula (2) when the sampling time is (k−1). The operation of "2. Prior error covariance update" is represented by the following formula (22).

[Math. 22]

$$P^-(k) \times P(k-1) + Q \tag{22}$$

In the aforementioned formula (22), the matrix P(k)⁻ is a prior error covariance matrix when the sampling time is (k), and the matrix P(k−1) is a posterior error covariance matrix when the sampling time is (k−1). The matrix Q in formula (22) is a system noise covariance matrix defined by the following formula (23), and E[•] in the following formula (23) is a symbol indicating expected value calculation.

[Math. 23]

$$Q \triangleq E[v(k)v^H(k)] \tag{23}$$

The operation of "3. Kalman gain update" is represented by the following formula (24).

[Math. 24]

$$G(k) = P^-(k)T^H(k)[T(k)P^-(k)T^H(k)+R]^{-1} \tag{24}$$

In the aforementioned formula (24), the matrix G(k) is a Kalman gain matrix. The matrix R in formula (24) is an observation noise covariance matrix defined by the following formula (25), and E[•] in the following formula (25) is a symbol indicating expected value calculation.

[Math. 25]

$$R \triangleq E[\tilde{z}(k)\tilde{z}^H(k)] \tag{25}$$

The matrix T in formula (24) is a matrix defined by the following formula (26). As can be ascertained from the following formula (26), the matrix T is a matrix including, in a part thereof, elements $\hat{x}_1^-$ to $\hat{x}_{N_t}^-$ of a vector $\hat{x}^-$ that is a prior output signal.

[Math. 26]

$$T = \left. \frac{\partial h(\phi)}{\partial \phi} \right|_{\phi=\hat{\phi}^-} \tag{26}$$

$$= -j \begin{pmatrix} \hat{x}_1^- & w_{11}^* y_1 e^{-j\phi_1^{t-}} e^{-j\phi_1^{r-}} & \cdots & w_{N_r1}^* y_{N_r} e^{-j\phi_1^{t-}} e^{-j\phi_{N_r}^{r-}} \\ & \ddots & \vdots & \ddots & \vdots \\ \hat{x}_{N_t}^- & w_{1N_t}^* y_1 e^{-j\phi_{N_t}^{t-}} e^{-j\phi_1^{r-}} & \cdots & w_{N_rN_t}^* y_{N_r} e^{-j\phi_{N_t}^{t-}} e^{-j\phi_{N_r}^{r-}} \end{pmatrix}$$

Although the matrix T(k) is represented with the variable k indicating the sampling time omitted in formula (26) from the viewpoint of visibility of description of the formula, the elements of the matrix T(k) are values changing for each sampling time, and the nominal notation in consideration of the sampling time is the following formula (27).

[Math. 27]

$$T(k) = \left. \frac{\partial h(\phi)}{\partial \phi} \right|_{\phi=\hat{\phi}^-(k)} \tag{27}$$

The operation of "4. Posterior state estimate update" is expressed by the following formula (28). In the following formula (28), the vector $\hat{x}^-(k)$ is a prior output signal as represented by formula (3) when the sampling time is (k). The vector $x_{HD}(k)$ in formula (28) is a provisional determination value vector obtained by performing provisional determination according to a predetermined signal modulation method on the vector $\hat{x}^-$ (k) that is the prior output signal.

[Math. 28]

$$\hat{\phi} = \hat{\phi}^-(k) + G(k)[x_{HD}(k) - \hat{x}^-(k)] \tag{28}$$

The operation of "5. Posterior error covariance update" is expressed by the following formula (29).

[Math. 29]

$$P(k) = [I_{N_t+N_r} - G(k)T(k)]P^-(k) \tag{29}$$

The operation of "6. Signal output value" is expressed by the following formula (30). The vector $\hat{x}(k)$ of the right side of formula (30) is an estimated sequence of the transmission signal vector x.

[Math. 30]

$$\hat{x}(k) = h(\hat{\phi}(k)) \tag{30}$$

Figure 3:
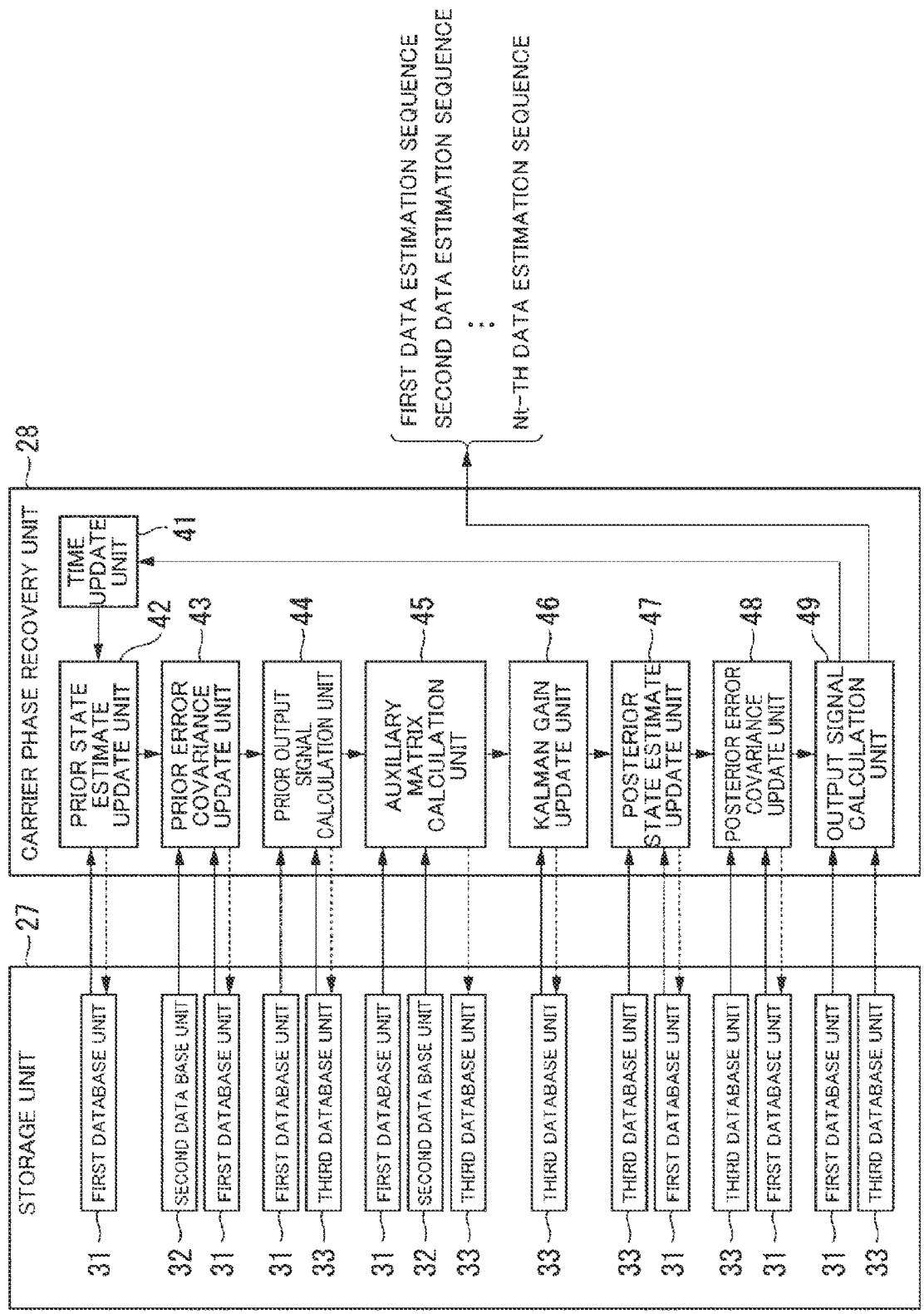
FIG. 3 is a block diagram showing an internal configuration of a carrier phase recovery unit of the first embodiment and which of the first database unit, the second database unit, and the third database unit included in the storage unit is used by each functional unit included in the carrier phase recovery unit.

FIG. 3 is a block diagram showing functional units of the carrier phase recovery unit 28 that executes the aforementioned Kalman filter algorithm, and which of the first database unit 31, the second database unit 32 and the third database unit 33 of the storage unit 27 is used by each functional unit. The carrier phase recovery unit 28 includes a time update unit 41, a prior state estimate update unit 42, a prior error covariance update unit 43, a prior output signal calculation unit 44, an auxiliary matrix calculation unit 45, a Kalman gain update unit 46, a posterior state estimate update unit 47, a posterior error covariance update unit 48, and an output signal calculation unit 49.

The time update unit 41 generates and outputs the variable k (hereinafter referred to as a "sampling time k") indicating a sampling time in the Kalman filter algorithm. The prior state estimate update unit 42 performs the aforementioned operation of "1. Prior state estimate update." The prior error covariance update unit 43 performs the aforementioned operation of "2. Prior miscalculation covariance update." The prior output signal calculation unit 44 calculates the prior output signal vector $\hat{x}^-(k)$ at the sampling time k used in the aforementioned operation of "4. Prior state estimate update" and the matrix T(k) at the sampling k used in the aforementioned operation of "3. Kalman gain update."

The auxiliary matrix calculation unit 45 calculates three auxiliary matrices A(k), B(k), and C(k) represented by the following formulas (31) to (33) used in the aforementioned operations of "3. Kalman gain update" and "5. Posterior error covariance update."

[Math. 31]

$$A(k) = P^-(k)T^H(k) \tag{31}$$

[Math. 32]

$$B(k) = T(k)A(k) \tag{32}$$

[Math. 33]

$$C(k) = (B(k)+R)^{-1} \tag{33}$$

The Kalman gain update unit 46 performs the aforementioned operation of "3. Kalman gain update." However, instead of the formula shown in formula (24), operation of the following formula (34) is performed using the auxiliary matrix A(k) and the auxiliary matrix C(k) calculated by the auxiliary matrix calculation unit 45 to calculate a Kalman gain matrix G(k) at the sampling time k.

[Math. 34]

$$G(k)=A(k)C(k) \qquad (34)$$

The posterior state estimate update unit 47 performs the aforementioned operation of "4. Posterior state estimate update." The posterior error covariance update unit 48 performs the aforementioned operation of "5. Posterior error covariance update." However, instead of the formula shown in formula (29), operation of the following formula (35) using the auxiliary matrix A(k) calculated by the auxiliary matrix calculation unit 45 is performed to calculate a posterior error covariance matrix P(k) at the sampling time k.

[Math. 35]

$$P(k)=P^-(k)-G(k)A^H(k) \qquad (35)$$

The output signal calculation unit 49 performs the aforementioned operation of "6. Signal output value."

(Processing Performed by Carrier Phase Recovery Unit of First Embodiment)

Next, processing performed by the carrier phase recovery unit 28 will be described with reference to FIG. 3 and FIG. 4.

Figure 4:
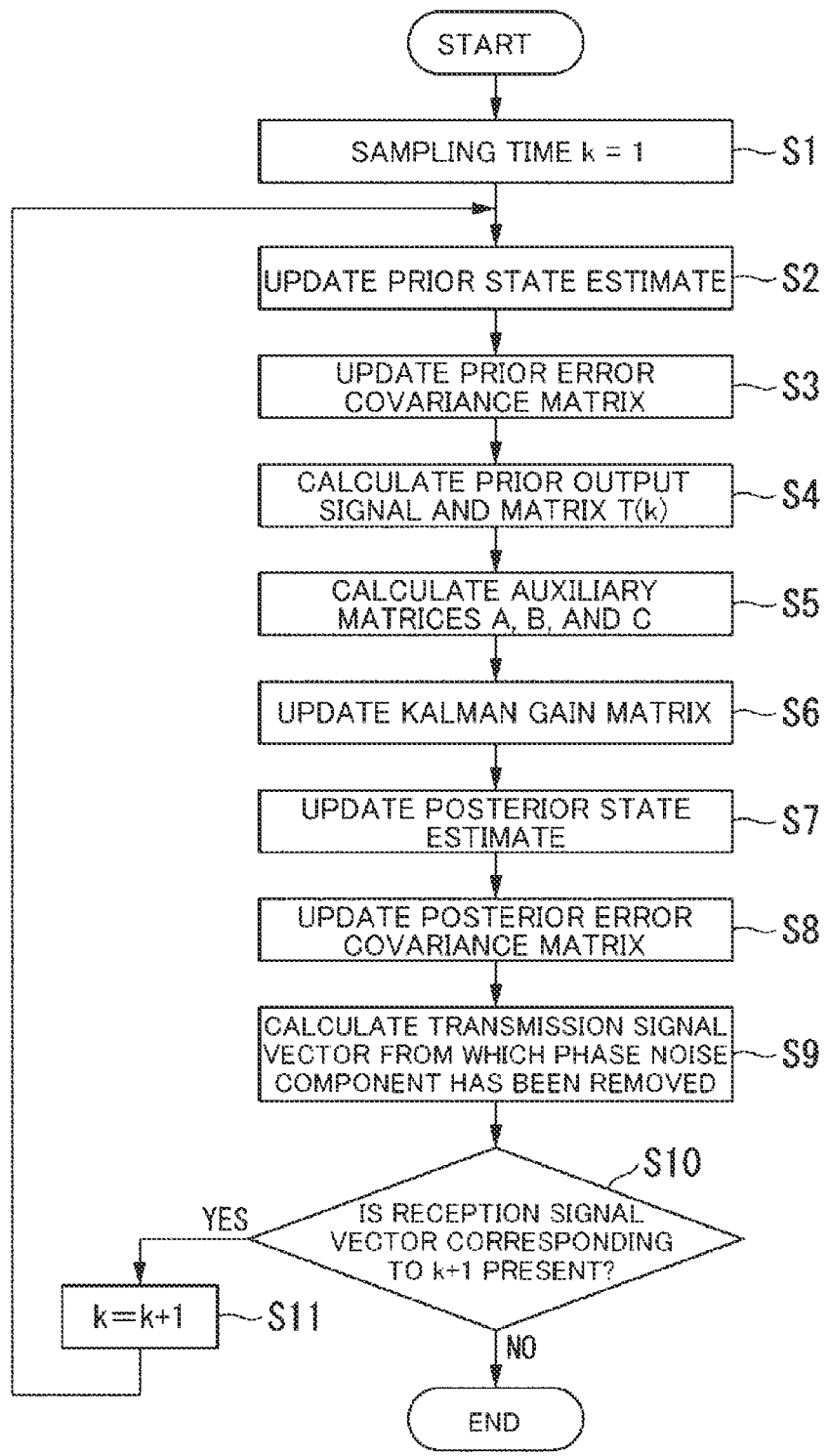
FIG. 4 is a flowchart showing a flow of processing performed by the carrier phase recovery unit of the first embodiment.

FIG. 4 is a flowchart showing a flow of processing performed by the carrier phase recovery unit 28.

As a premise of processing which will be described below, the weight matrix calculation unit 26 performs processing of sequentially increasing the variable k indicating the sampling time by 1 from 1 for a weight matrix W to be applied to the case of performing MIMO linear reception on a fetched reception signal vector y and the fetched reception signal vector y each time the reception signal vector y output by the digital signal processing unit 25 is fetched and writing them in the third database unit 33 as W(k) and y(k). In other words, the third database unit 33 stores time-series data [W(1), y(1)], [W(2), y(2)], . . . as weight matrix calculation unit output data. It is assumed that the weight matrix calculation unit 26 stores, for example, a pilot symbol for weight matrix calculation, which is periodically included in the transmission signal vector x and transmitted by the transmission device 1, in an internal storage area in advance, and when the transmission device 1 transmits the pilot symbol for weight matrix calculation, calculates a new weight matrix W on the basis of a reception signal vector output by the digital signal processing unit 25 and the pilot symbol for weight matrix calculation stored in the internal storage area.

It is assumed that a vector ˆφ(0) is written in advance as an initial value of a posterior state estimate, and a posterior error covariance matrix P(0) is written in advance as an initial value of a posterior error covariance matrix in the first database unit 31. It is assumed that a system noise covariance matrix Q is calculated on the basis of formulas (20) and (23) and written in advance, and an observation noise covariance matrix R is calculated on the basis of formulas (14) and (15) and written in advance in the second database unit 32. Although ~z(k) and ~z$^H$(k) include the sampling time k as a variable in formula (25), ~z is a steady value if transmission power does not change as can be ascertained from formula (14). Therefore, a change in the observation noise covariance matrix R is a change at an interval sufficiently longer than the interval of the sampling time k, and the observation noise covariance matrix R can be regarded as a steady value, and thus the observation noise covariance matrix R can be calculated in advance on the basis of formulas (14) and (25).

The time update unit 41 sets an initial value of the sampling time k to "1" and outputs the sampling time (k=1) of the initial value to the prior state estimate update unit 42 (step S1).

When the sampling time k is received from the time update unit 41, the prior state estimate update unit 42 reads a vector ˆφ(k−1) which is a posterior state estimate, from the first database unit 31 on the basis of the received sampling time k, and performs an operation of formula (21), that is, operation of setting the read vector ˆφ(k−1) to a vector ˆφ$^-$(k) which is a prior state estimate. The prior state estimate update unit 42 writes the vector ˆφ$^-$(k) which is the prior state estimate in the first database unit 31 to update it. When a vector ˆφ$^-$(k−1) at a sampling time k−1 has been written in the first database unit 31, the prior state estimate update unit 42 deletes the vector ˆφ$^-$(k−1) and writes the vector ˆφ$^-$(k) to update it. The prior state estimate update unit 42 outputs the sampling time k to the prior error covariance update unit 43 (step S2).

When the sampling time k is received from the prior state estimate update unit 42, the prior error covariance update unit 43 reads a system noise covariance matrix Q from the second database unit 32 on the basis of the received sampling time k. The prior error covariance update unit 43 reads a posterior error covariance matrix P(k−1) from the first database unit 31. The prior error covariance update unit 43 calculates a prior error covariance matrix P$^-$(k) by performing operation of formula (22) on the basis of the read system noise covariance matrix Q and the posterior error covariance matrix P(k−1). The prior error covariance update unit 43 writes the calculated prior error covariance matrix P$^-$(k) in the first database unit 31 to update it. When the prior error covariance matrix P$^-$(k−1) at the sampling time k−1 has been written in the first database unit 31, the prior error covariance update unit 43 deletes the prior error covariance matrix P$^-$(k−1) and writes the prior error covariance matrix P$^-$(k) to update it. The prior error covariance update unit 43 outputs the sampling time k to the prior output signal calculation unit 44 (step S3).

When the sampling time k is received from the prior error covariance update unit 43, the prior output signal calculation unit 44 reads the vector ˆφ$^-$(k), which is the prior state estimate, from the first database unit 31 on the basis of the received sampling time k. The prior output signal calculation unit 44 reads the weight matrix W(k) and the reception signal vector y(k) from the third database unit 33. The prior output signal calculation unit 44 performs operation of the following formula (36) on the basis of the read vector ˆφ$^-$(k) which is the prior state estimate, the weight matrix W(k), and the reception signal vector y(k) to calculate a vector ˆx$^-$(k) which is a prior output signal.

[Math. 36]

$$\hat{x}^-(k)=h(\hat{\phi}^-(k)) \qquad (36)$$

The prior output signal calculation unit 44 calculates the matrix T(k) represented by formulas (26) and (27) on the basis of the vector ˆx$^-$(k) that is the calculated prior output signal, the vector ˆφ$^-$(k) that is the prior state estimate, the weight matrix W(k), and the reception signal vector y(k). The prior output signal calculation unit 44 writes the calculated vector ˆx$^-$(k) that is the prior output signal in the third database unit 33 to update it. When the vector ˆx$^-$(k−1) at the sampling time k−1 has been written in the third database unit 33, the prior output signal calculation unit 44 deletes the vector $\hat{x}^-(k-1)$ and writes the vector $\hat{x}^-(k)$ to update it. The prior output signal calculation unit 44 outputs the calculated matrix T(k) and the sampling time k to the auxiliary matrix calculation unit 45 (step S4).

The auxiliary matrix calculation unit 45 fetches the matrix T(k) output from the prior output signal calculation unit 44. The auxiliary matrix calculation unit 45 reads the prior error covariance matrix P⁻(k) from the first database unit 31 on the basis of the sampling time k received from the prior output signal calculation unit 44. The auxiliary matrix calculation unit 45 reads the observation noise covariance matrix R from the second database unit 32. The auxiliary matrix calculation unit 45 performs operations of formulas (31), (32), and (33) on the basis of the fetched matrix T(k), the read prior error covariance matrix P⁻(k), and observation noise covariance matrix R to calculate auxiliary matrices A(k), B(k), and C(k).

The auxiliary matrix calculation unit 45 writes the calculated auxiliary matrices A(k), B(k), and C(k) in the third database unit 33 to update it. When auxiliary matrices A(k−1), B(k−1), and C(k−1) at the sampling time k−1 have been written in the third database unit 33, the auxiliary matrix calculation unit 45 deletes the auxiliary matrices A(k−1), B(k−1), and C(k−1) and write the auxiliary matrices A(k), B(k) and C(k) to update it. The auxiliary matrix calculation unit 45 outputs the sampling time k to the Kalman gain update unit 46 (step S5).

When the sampling time k is received from the auxiliary matrix calculation unit 45, the Kalman gain update unit 46 reads the auxiliary matrices A(k) and C(k) from the third database unit 33 on the basis of the received sampling time k. The Kalman gain update unit 46 performs operation of formula (34) on the basis of the read auxiliary matrices A(k) and C(k) to calculate a Kalman gain matrix G(k). The Kalman gain update unit 46 writes the calculated Kalman gain matrix G(k) in the third database unit 33 to update it. When a Kalman gain matrix G(k−1) at the sampling time (k−1) has been written in the third database unit 33, the Kalman gain update unit 46 deletes the Kalman gain matrix G(k−1) and writes the Kalman gain matrix G(k) to update it. The Kalman gain update unit 46 outputs the sampling time k to the posterior state estimate update unit 47 (step S6).

When the sampling time k is received from the Kalman gain update unit 46, the posterior state estimate update unit 47 reads a Kalman gain matrix G(k) and the vector $\hat{x}^-(k)$ that is the prior output signal from the third database unit 33 on the basis of the received sampling time k. The posterior state estimate update unit 47 reads the vector $\hat{\varphi}^-(k)$ that is the prior state estimate from the first database unit 31. The posterior state estimate update unit 47 calculates a provisional determination value vector $x_{HD}(k)$ by performing provisional determination according to a predetermined signal modulation method on the vector $\hat{x}^-(k)$ that is the prior output signal.

The posterior state estimate update unit 47 performs operation of formula (28) on the basis of the calculated provisional determination value vector $x_{HD}(k)$, the read vector $\hat{\varphi}^-(k)$ that is the prior state estimate, the Kalman gain matrix G(k), and the vector $\hat{x}^-(k)$ that is the prior output signal to calculate a vector $\hat{\varphi}(k)$ that is a posterior state estimate. The posterior state estimate update unit 47 writes the calculated vector $\hat{\varphi}(k)$ that is the posterior state estimate in the first database unit 31 to update it. When a vector $\hat{\varphi}(k-1)$ at the sampling time k−1 has been written in the first database unit 31, the posterior state estimate update unit 47 deletes the vector $\hat{\varphi}(k-1)$ and writes the vector $\hat{\varphi}(k)$ to update it. The posterior state estimate update unit 47 outputs the sampling time k to the posterior error covariance update unit 48 (step S7).

When the sampling time k is received from the posterior state estimate update unit 47, the posterior error covariance update unit 48 reads the Kalman gain matrix G(k) and the auxiliary matrix A(k) from the third database unit 33 on the basis of the received sampling time k. The posterior error covariance update unit 48 reads the posterior error covariance matrix P⁻(k) from the first database unit 31. The posterior error covariance update unit 48 performs operation of formula (35) on the basis of the read Kalman gain matrix G(k), the auxiliary matrix A(k), and the prior error covariance matrix P⁻(k) to calculate a posterior error covariance matrix P(k). The posterior error covariance update unit 48 writes the calculated posterior error covariance matrix P(k) in the first database unit 31 to update it. When a posterior error covariance matrix P(k−1) at the sampling time k−1 has been written in the first database unit 31, the posterior error covariance update unit 48 deletes the posterior error covariance matrix P(k−1) and writes the posterior error covariance matrix P(k) to update it. The posterior error covariance update unit 48 outputs the sampling time k to the output signal calculation unit 49 (step S9).

When the sampling time k is received from the posterior error covariance update unit 48, the output signal calculation unit 49 reads the vector $\hat{\varphi}(k)$ that is the posterior state estimate from the first database unit 31 on the basis of the received sampling time k. The output signal calculation unit 49 calculates the vector $\hat{x}(k)$, which is an estimated sequence of the transmission signal vector x, by performing operation of formula (30) on the basis of the read vector $\hat{\varphi}(k)$, which is the posterior state estimate, and outputs a first data estimation sequence, a second data estimation sequence, . . . , an Nt-th data estimation sequence which are elements of the calculated vector $\hat{x}(k)$ to the outside.

The output signal calculation unit 49 refers to the third database unit 33 and determines whether or not the third database unit 33 stores a reception signal vector y(k+1) corresponding to a sampling time k+1 obtained by adding 1 to the current sampling time k (step S10). The output signal calculation unit 49 outputs the sampling time k to the time update unit 41 when it is determined that the third database unit 33 stores the reception signal vector y(k+1) corresponding to the sampling time k+1 (Yes in step S10). The time update unit 41 sets a value obtained by adding 1 to the sampling time k as a new sampling time k and outputs the new sampling time k to the prior state estimate update unit 42 (step S11). Thereafter, processing of step S2 and following are executed.

On the other hand, when it is determined that the third database unit 33 does not store the reception signal vector y(k+1) corresponding to the sampling time k+1 (No in step S10), the output signal calculation unit 49 ends processing.

In the above-described communication system 100 of the first embodiment, the transmission line 3 is a multi-mode optical fiber and transmits a plurality of optical signals in a plurality of spatial modes. The transmission device 1 includes the plurality of transmission units 11-1 to 11-Nt, and each of the plurality of transmission units 11-1 to 11-Nt modulates continuous light of a carrier output by each of the carrier generation units 13-1 to 13-Nt included therein to generate a transmission optical signal on the basis of a transmission data sequence provided thereto and transmits the generated transmission optical signal to the transmission line 3. The reception device 2 includes the plurality of reception units 21-1 to 21-Nr, and the plurality of reception units 21-1 to 21-Nr receive a plurality of optical signals transmitted through the transmission line 3 in a plurality of spatial modes and demodulate the received optical signals on the basis of continuous light as local oscillation signals output by the local oscillation units 23-1 to 23-Nr respectively included therein to generate reception data sequences. The signal detection unit 24 includes the weight matrix calculation unit 26 and the carrier phase recovery unit 28, and the weight matrix calculation unit 26 calculates a weight matrix W to be used at the time of performing MIMO linear reception on the reception data sequences. The carrier phase recovery unit 28 assumes a phase noise component, which is an interference component generated because the plurality of carrier generation units 13-1 to 13-Nt and the plurality of local oscillation units 23-1 to 23Nr are asynchronous and is caused by phase fluctuation of a light source included in each of the plurality of carrier generation units 13-1 to 13-Nt and the plurality of local oscillation units 23-1 to 23-Nr, as state information, assumes a predetermined state equation for calculating posterior state information on the basis of prior state information and a transmission data sequence as observation information, applies the Kalman filter algorithm to a predetermined observation equation for calculating observation information in a state indicated by the posterior state information to calculate a posterior state estimate on the basis of the prior state information calculated by the state equation, a reception data sequence, and a weight matrix, and calculates an estimated sequence of the transmission data sequence obtained by removing the phase noise component, which is an interference component and is caused by phase fluctuation of the light source included in each of the plurality of carrier generation units 13-1 to 13-Nt and the plurality of local oscillation units 23-1 to 23-Nr on the basis of the calculated posterior state estimate.

Accordingly, when a plurality of signals are transmitted in a plurality of modes of the same transmission medium, it is possible to remove a phase noise component, which is an interference component generated because carriers generated by the transmission device 1 and local oscillation signals generated by the reception device 2 are asynchronous and is caused by phase fluctuation of a light source included in each of the plurality of carrier generation units 13-1 to 13-Nt and the plurality of local oscillation units 23-1 to 23-Nr. Therefore, in coherent transmission for transmitting a plurality of signals in a plurality of modes of the same transmission medium, asynchronous light sources can be applied to the light sources of the carrier generation units 13-1 to 13-Nt of the transmission device 1 and the light sources of the local oscillation units 23-1 to 23-Nr of the reception device 2. In other words, it is possible to transmit a plurality of signals in a plurality of modes of the same transmission medium in a state in which carriers generated by the transmission device 1 and local oscillation signals generated by the reception device 2 are asynchronous.

Second Embodiment

Figure 5:
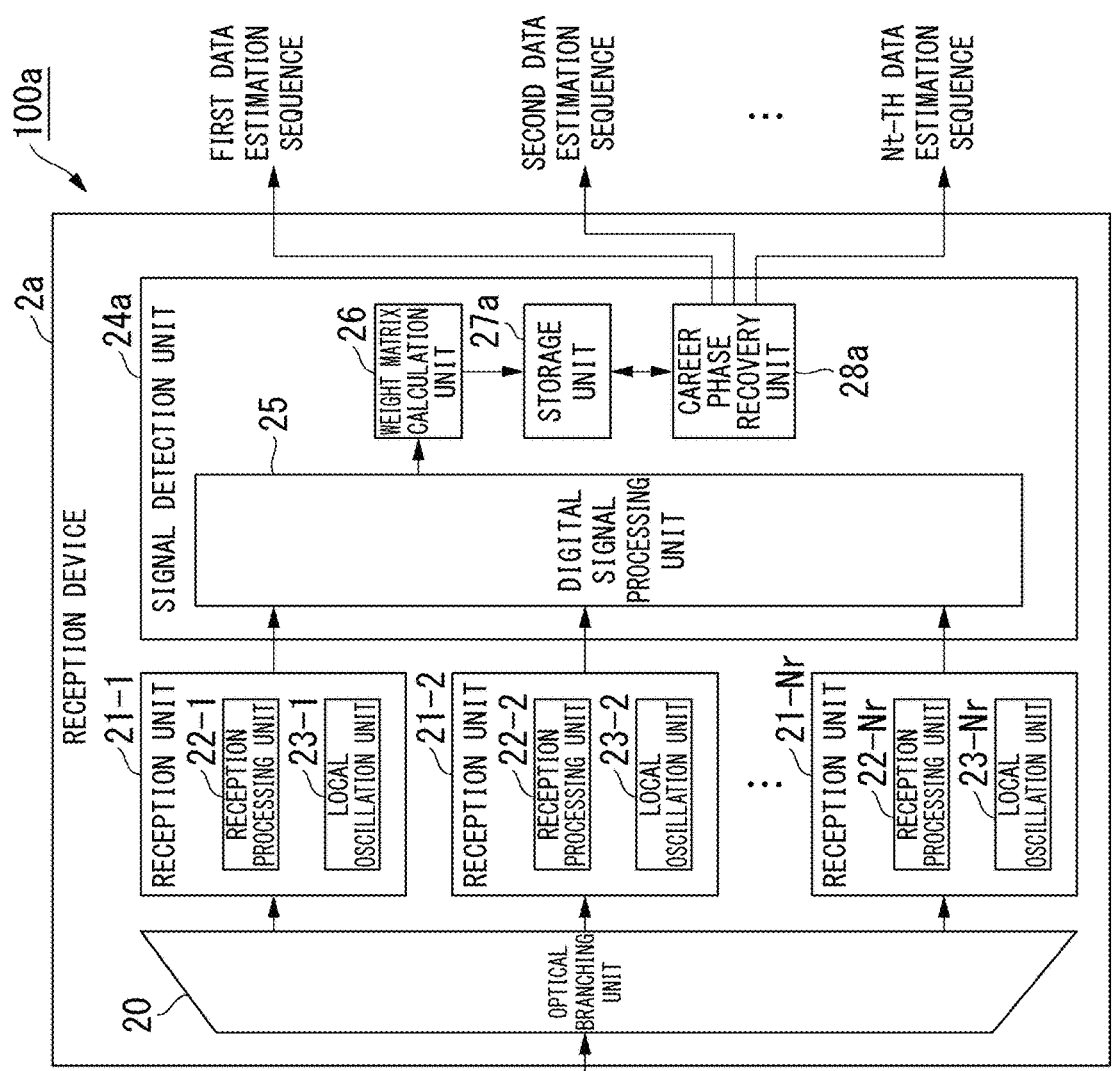
FIG. 5 is a block diagram showing a configuration of a communication system of a second embodiment.
Figure 5:
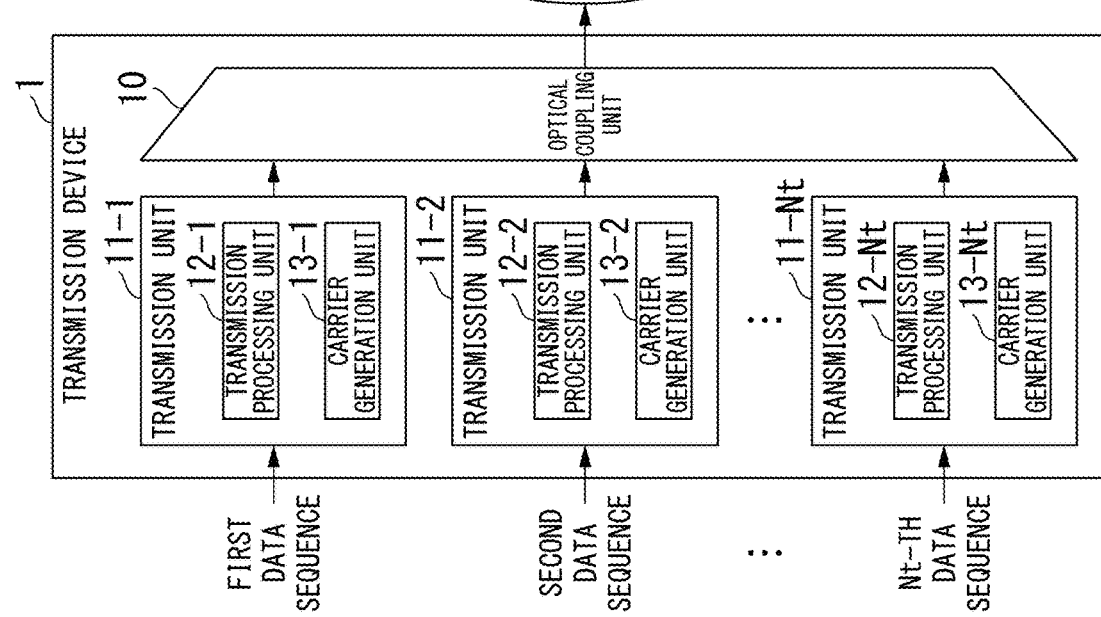

Hereinafter, a second embodiment of the present invention will be described with reference to the drawings. FIG. 5 is a block diagram showing a configuration of a communication system 100a according to the second embodiment. In the second embodiment, identical configurations to the first embodiment have been allocated identical reference symbols, and only different configurations will be described below. The communication system 100a includes a transmission device 1, a reception device 2a, and a transmission line 3 connecting the transmission device 1 and the reception device 2a.

Figure 6:
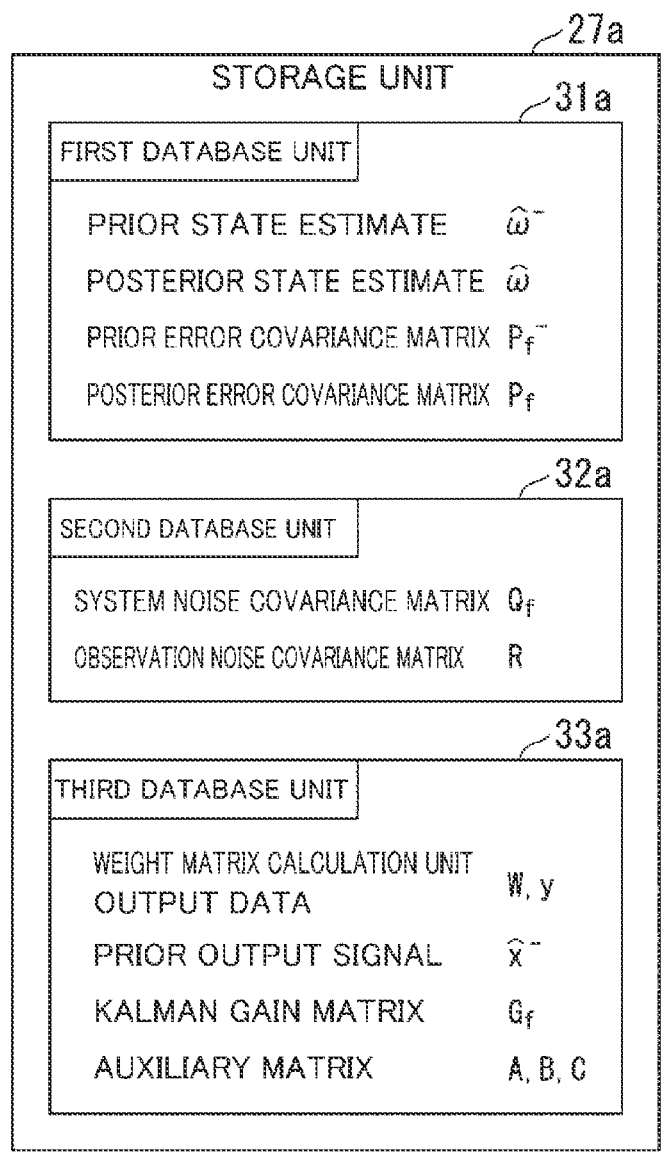
FIG. 6 is a diagram showing data configurations of a first database unit, a second database unit, and a third database unit included in a storage unit of the second embodiment.

The reception device 2a includes an optical branching unit 20, Nr reception units 21-1 to 21-Nr, and a signal detection unit 24a. The signal detection unit 24a includes a digital signal processing unit 25, a weight matrix calculation unit 26, a storage unit 27a and a carrier phase recovery unit 28a. The storage unit 27a includes a first database unit 31a, a second database unit 32a, and a third database unit 33a, as shown in FIG. 6.

The first database unit 31a stores a prior state estimate, a posterior state estimate, a prior error covariance matrix Pc, and a posterior error covariance matrix Pf. The prior state estimate and the posterior state estimate are vectors and are represented as the following formulas (37) and (38).

[Math. 37]

$$\hat{\omega}^- \tag{37}$$

[Math. 38]

$$\hat{\omega} \tag{38}$$

Hereinafter, a symbol indicating the prior state estimate of formula (37) is described as a vector $\hat{\omega}^-$, a symbol indicating the posterior state estimate of formula (38) is described as a vector $\hat{\omega}$ in the text.

The second database unit 32a stores a system noise covariance matrix $Q_f$ and an observation noise covariance matrix R.

The third database unit 33a stores weight matrix calculation unit output data, a prior output signal which is a vector $\hat{x}^-$, a Kalman gain matrix $G_f$, an auxiliary matrix A, an auxiliary matrix B, and an auxiliary matrix C. The weight matrix calculation unit output data is data written by the weight matrix calculation unit 26 and includes a weight matrix W and a reception signal vector Y as in the first embodiment. Similarly to FIG. 2 of the first embodiment, FIG. 6 also shows a variable k indicating the sampling time without being added thereto.

The carrier phase recovery unit 28a estimates an interference component caused by phase fluctuations of the carrier generation units 13-1 to 13-Nt and an interference component caused by phase fluctuations of the local oscillation units 23-1 to 23-Nr. The carrier phase recovery unit 28a calculates an estimated sequence of a transmission signal vector x from which the detected two interference components have been removed.

In the second embodiment, the carrier phase recovery unit 28a uses, as two interference components, a phase noise component and a frequency offset component caused by phase fluctuation of each of the light sources of the carrier generation units 13-1 to 13-Nr, and a phase noise component and a frequency offset component caused by phase fluctuation of each of the light sources of the local oscillation units 23-1 to 23-Nr.

Here, it is assumed that frequency offset components caused by frequency fluctuations of the light sources of the carrier generation units 13-1 to 13-Nr are $\psi_1^t, \psi_2^t, \ldots, \psi_{Nt}^t$, and frequency offset components caused by frequency fluctuations of the light sources of the local oscillation units 23-1 to 23-Nr are $\psi_1^r, \psi_2^r, \ldots, \psi_{Nr}^r$. Here, a frequency offset component vectors $\psi^t$ which is a column vector having the frequency offset components $\psi_1^t, \psi_2^t, \ldots, \psi_{Nt}^t$ caused by frequency fluctuations of the light sources of the carrier generation units 13-1 to 13-Nt as elements is defined as the following formula (39).

[Math. 39]

$$\psi^t \triangleq \begin{pmatrix} \psi_1^t \\ \vdots \\ \psi_{N_t}^t \end{pmatrix} \quad (39)$$

A frequency offset component vector $\psi^r$ which is a column vector having the frequency offset components $\psi_1^r$, $\psi_2^r, \ldots, \psi_{N_r}^r$ caused by frequency fluctuations of the light sources of the local oscillation units 23-1 to 23-Nr as elements is defined as the following formula (40).

[Math. 40]

$$\psi^r \triangleq \begin{pmatrix} \psi_1^r \\ \vdots \\ \psi_{N_r}^r \end{pmatrix} \quad (40)$$

A vector $\omega$ including phase noise component vectors $\varphi^t$ and $\varphi^r$ and frequency offset component vectors $\psi^t$ and $\psi^r$ which are targets estimated by the carrier phase recovery unit 28a are defined by the following formula (41).

[Math. 41]

$$\omega \triangleq \begin{bmatrix} \phi^t \\ \phi^r \\ \psi^t \\ \psi^r \end{bmatrix} \quad (41)$$

In this case, a state equation related to the vector $\omega$ estimated by the carrier phase recovery unit 28a can be represented as the following formula (42).

[Math. 42]

$$\omega(k+1) = M\omega(k) + v(k) \quad (42)$$

In formula (42), the matrix M is represented by the following formula (43), and the vector v(k) is represented by the following formula (44).

[Math. 43]

$$M \triangleq \begin{bmatrix} I_{N_t+N_r} & I_{N_t+N_r}^{(i)} \\ 0_{N_t+N_r,N_t+N_r} & I_{N_t+N_r} \end{bmatrix} \quad (43)$$

[Math. 44]

$$v(k) \triangleq \begin{bmatrix} v(k) \\ 0_{N_t+N_r,1} \end{bmatrix} \quad (44)$$

In formulas (43) and (44), the symbol in the following formula (45) means a matrix in which all elements of m rows and n columns are 0.

[Math. 45]

$$0_{m,n} \quad (45)$$

The symbol in the following formula (46) means a matrix in which an (i, i)-th element is set to 0 in a unit matrix having m rows and n columns.

[Math. 46]

$$I_m^{(i)} \quad (46)$$

The vector v(k) on the right side of formula (44) is a vector represented by formula (30) in the first embodiment.

The observation equation in the second embodiment is a formula represented by formula (18) as in the first embodiment, and a Kalman filter algorithm based on the observation equation represented by formula (18) and the state equation represented by formula (42) is an algorithm that repeats a series of operations of 1a. Prior state estimate update, 2a. Prior miscalculation covariance update, 3a. Kalman gain update, 4a. Posterior state estimate update, 5a. Posterior error covariance update, 6a. Signal output value. The operation of "1a. Prior state estimate update" is represented by formula (47).

[Math. 47]

$$\hat{\omega}^-(k) = M\hat{\omega}(k-1) \quad (47)$$

In the aforementioned formula (47), the vector $\hat{\omega}^-(k)$ is the prior state estimate indicated by formula (37) and is the prior state estimate when a sampling time is (k), and the vector $\hat{\omega}(k-1)$ is the posterior state estimate indicated by formula (38) and is the posterior state estimate when the sampling time is (k−1). The operation of "2a. Prior error covariance update" is represented by the following formula (48).

[Math. 48]

$$P_f^-(k) = MP_f(k-1)M^H + Q_f \quad (48)$$

In the aforementioned formula (48), the matrix $P(k)^-$ is a prior error covariance matrix when the sampling time is (k), the matrix P(k−1) is a posterior error covariance matrix when the sampling time is (k−1), the matrix $Q_f$ is a system noise covariance matrix defined by the following formula (49), and E[•] in the following formula (49) is a symbol indicating an expected value operation.

[Math. 49]

$$Q_f \triangleq E[v(k)v^H(k)] \quad (49)$$

The operation of "3a. Kalman gain update" is represented by the following formula (50).

[Math. 50]

$$G_f(k) = P_f^-(k)T_f^H(k)[T_f(k)P_f^-(k)T_f^H(k) + R]^{-1} \quad (50)$$

In the aforementioned formula (50), the matrix $G_f(k)$ is a Kalman gain matrix in the second embodiment, and the matrix R is an observation noise covariance matrix represented by formula (25) as in the first embodiment.

The matrix $T_f$ is a matrix defined by the following formula (51).

[Math. 51]

$$T_f \triangleq [T 0_{N_t,N_t+N_r}] \quad (51)$$

The matrix T indicated by formula (51) is a matrix indicated by formula (26) in the first embodiment. Although the matrix $T_f(k)$ is represented with the variable k indicating the sampling time omitted in formula (51) from the viewpoint of visibility of description of the formula, the elements of the matrix $T_f(k)$ are values that change every sampling time, and formal notation considering the sampling time is the following formula (52).

[Math. 52]

$$T_f(k) = \left.\frac{\partial h(\omega)}{\partial \omega}\right|_{\omega=\hat{\omega}-(k)} \quad (52)$$

The operation of "4a. Posterior state estimate update" is represented by the following formula (53).

[Math. 53]

$$\hat{\omega}(k)=\hat{\omega}-(k)+G_f(k)[x_{HD}(k)-\hat{x}^-(k)] \quad (53)$$

The operation of "5a. Posterior error covariance update" is represented by the following formula (54).

[Math. 54]

$$P_f(k)=[I_{2N_t+2N_r}-G_f(k)T_f(k)]P_f^-(k) \quad (54)$$

The operation of "6a. Signal output value" is represented by the following formula (55). Although formula (55) shows a formula for substituting the vector $\hat{\omega}(k)$, which is the posterior state estimate, for the nonlinear function h(•) represented by formula (17), calculation of the nonlinear function h(•) is a function targeting the vector $\hat{\varphi}(k)$, which is the posterior state estimate in the first embodiment.

Therefore, the operation represented by formula (55) is an operation for substituting the vector $\hat{\varphi}(k)$ included in the vector $\hat{\omega}(k)$ for the nonlinear function h(•), and the relationship represented by formula (55) is established. The vector $\hat{x}(k)$ in the formula (55) becomes an estimated sequence of the transmission signal vector x in the second embodiment.

[Math. 55]

$$\hat{x}(k)=h(\hat{\omega}(k))=h(\hat{\varphi}(k)) \quad (55)$$

Figure 7:
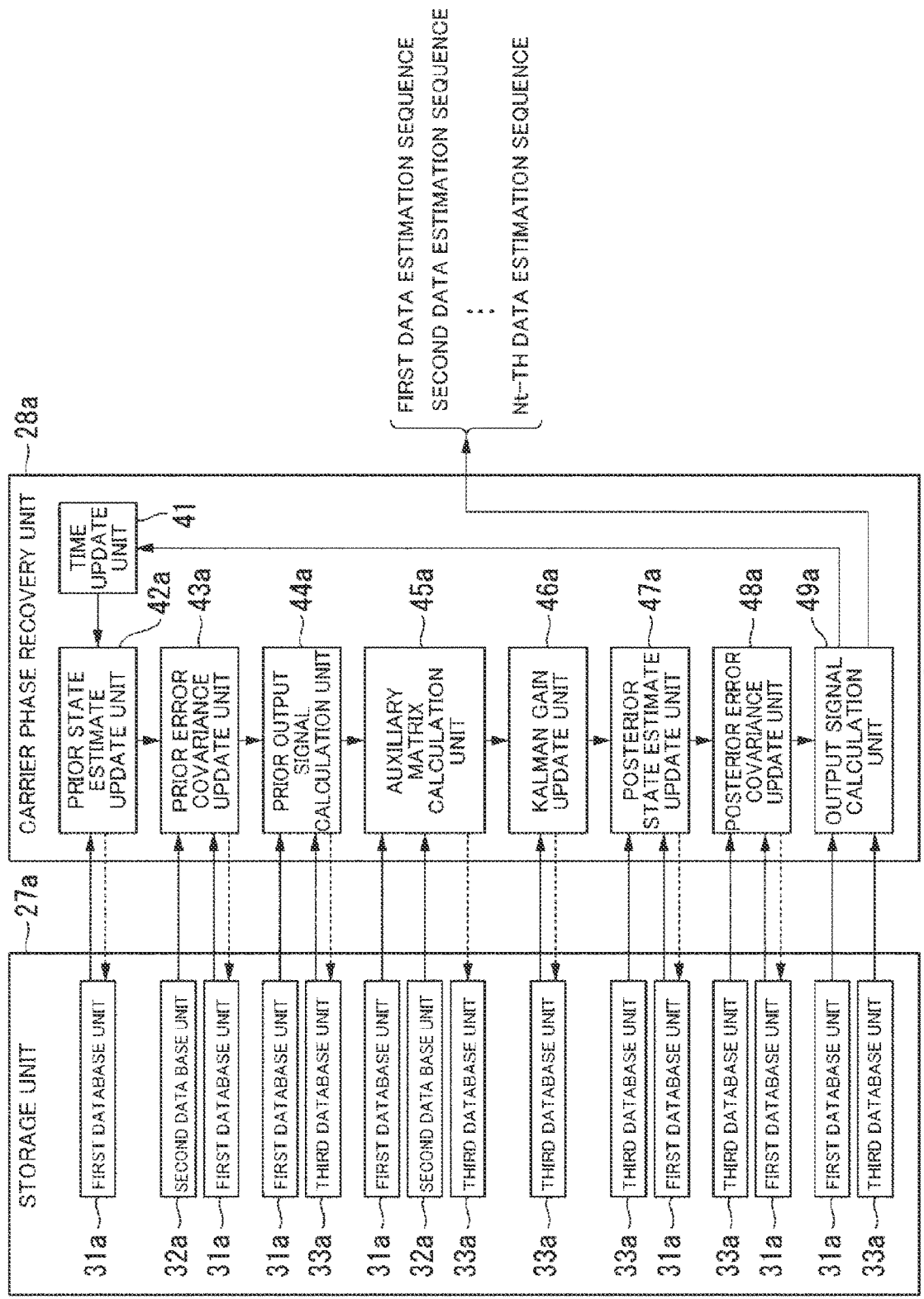
FIG. 7 is a block diagram showing an internal configuration of a carrier phase recovery unit of the second embodiment and which of the first database unit, the second database unit, and the third database unit included in the storage unit is used by each functional unit included in the carrier phase recovery unit.

FIG. 7 is a block diagram showing functional units included in the carrier phase recovery unit 28a that executes the Kalman filter algorithm of the above-described second embodiment and which of the first database unit 31a, the second database unit 32a, and the third database unit 33a included in the storage unit 27a is used by each functional unit. The carrier phase recovery unit 28a includes a time update unit 41, a prior state estimate update unit 42a, a prior error covariance update unit 43a, a prior output signal calculation unit 44a, an auxiliary matrix calculation unit 45a, a Kalman gain update unit 46a, a posterior state estimate update unit 47a, a posterior error covariance update unit 48a, and an output signal calculation unit 49a.

The prior state estimate update unit 42a performs the aforementioned operation of "1a. Prior state estimate update." The prior error covariance update unit 43a performs the aforementioned operation of "2. Prior miscalculation covariance update." The prior output signal calculation unit 44a calculates a prior output signal vector $\hat{x}^-(k)$ at the sampling time k used in the aforementioned operation of "4a. Posterior state estimate update" and A matrix $T_f(k)$ at the sampling time k used in the aforementioned operation of "3a. Kalman gain update."

The auxiliary matrix calculation unit 45a calculates three auxiliary matrices A(k), B(k), and C(k) represented by the following formulas (56) to (58), which are used in the aforementioned operations of "3a. Kalman gain update" and "5a. Posterior error covariance update."

[Math. 56]

$$A(k)=P_f^-(k)T_f^H(k) \quad (56)$$

[Math. 57]

$$B(k)=T_f(k)A(k) \quad (57)$$

[Math. 58]

$$C(k)=(B(k)+R)^{-1} \quad (58)$$

The Kalman gain update unit 46a performs the aforementioned operation of "3a. Kalman gain update." However, instead of the formula represented by formula (50), operation of the following formula (59) is performed using the auxiliary matrix A(k) and the auxiliary matrix C(k) calculated by the auxiliary matrix calculation unit 45a to calculate the Kalman gain matrix $G_f(k)$.

[Math. 59]

$$G_f(k)=A(k)C(k) \quad (59)$$

The posterior state estimate update unit 47a performs the aforementioned operation of "4a. Posterior state estimate update." The posterior error covariance update unit 48a performs the aforementioned operation of "5a. Posterior error covariance update." However, instead of the formula represented by formula (54), operation of formula (60) using the auxiliary matrix A(k) calculated by the auxiliary matrix calculation unit 45a is performed to calculate the posterior error covariance matrix $P_f(k)$.

[Math. 60]

$$P_f(k)=P_f^-(k)-G_f(k)A^H(k) \quad (60)$$

The output signal calculation unit 49a performs the aforementioned operation of "6a. Signal output value."

(Processing Performed by Carrier Phase Recovery Unit of Second Embodiment)

Figure 8:
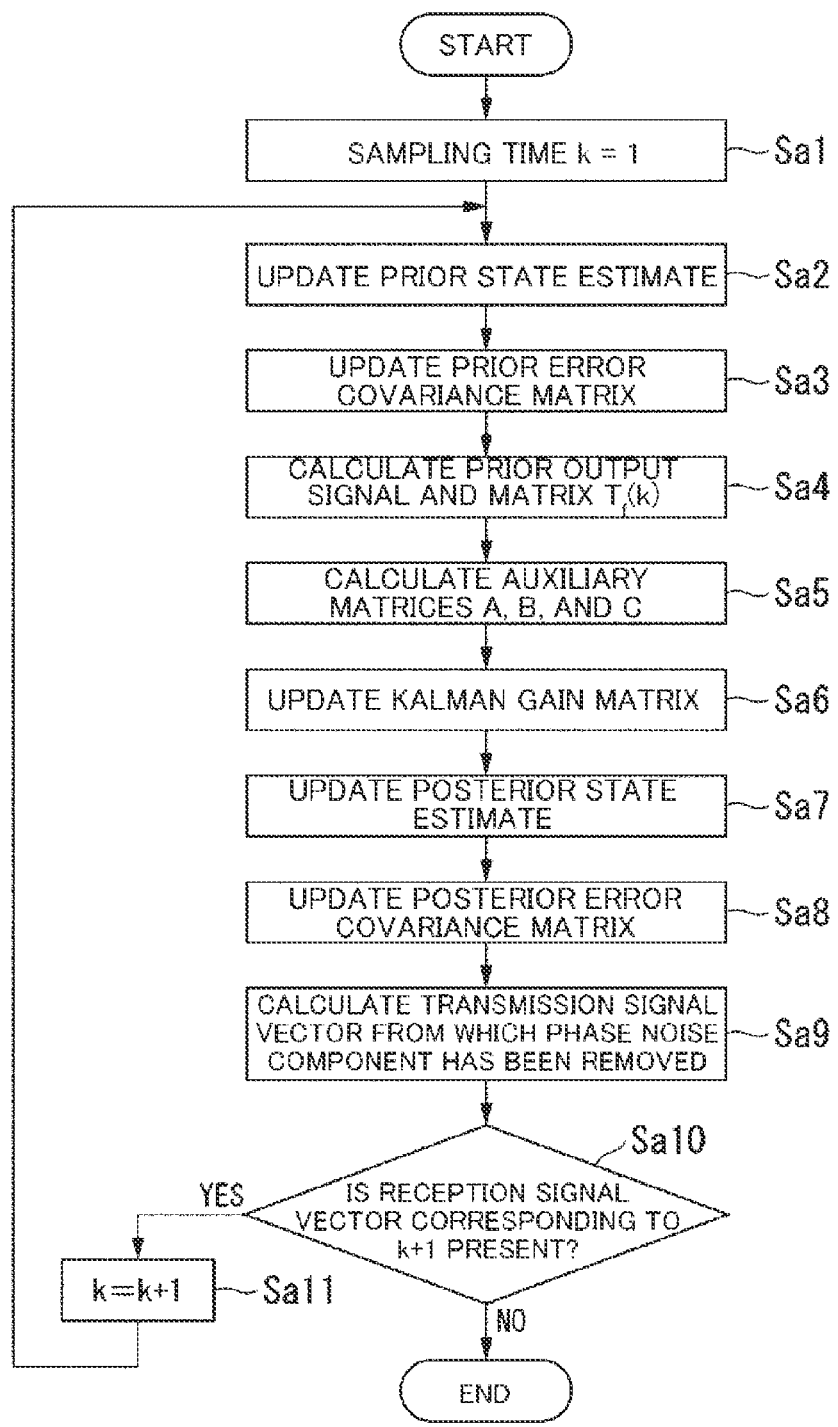
FIG. 8 is a flowchart showing a flow of processing performed by the carrier phase recovery unit of the second embodiment.

Next, processing performed by the carrier phase recovery unit 28a will be described with reference to FIG. 7 and FIG. 8. FIG. 8 is a flowchart showing a flow of processing performed by the carrier phase recovery unit 28a.

As a premise of processing which will be described below, as in the first embodiment, the weight matrix calculation unit 26 performs processing of sequentially increasing the variable k indicating the sampling time by 1 from 1 for a weight matrix W to be applied to the case of performing MIMO linear reception on a fetched reception signal vector y and the fetched reception signal vector y each time the reception signal vector y output by the digital signal processing unit 25 is fetched and writing them in the third database unit 33a as W(k) and y(k). In other words, the third database unit 33 stores time-series data [W(1), y(1)], [W(2), y(2)], . . . as weight matrix calculation unit output data. It is assumed that the weight matrix calculation unit 26 stores, for example, a pilot symbol for weight matrix calculation, which is periodically included in the transmission signal vector x and transmitted by the transmission device 1, in an internal storage area in advance, and when the transmission device 1 transmits the pilot symbol for weight matrix calculation and demodulates the received radio signals by local oscillation waves of electrical signals, calculates a new weight matrix W on the basis of a reception signal vector output by the digital signal processing unit 25 and the pilot symbol for weight matrix calculation stored in the internal storage area.

It is assumed that a vector $\hat{\omega}(0)$ is written in advance as an initial value of a posterior state estimate, and a posterior error covariance matrix $P_f(0)$ is written in advance as an initial value of a posterior error covariance matrix in the first database unit 31a. It is assumed that the system noise covariance matrix $Q_f$ is calculated on the basis of formulas

(44) and (49) and written in advance, and the observation noise covariance matrix R is calculated on the basis of formulas (14) and (25) and written in advance in the second database unit 32a. Each of the prior state estimate update unit 42a and the prior error covariance update unit 43a stores the matrix M represented by formula (43) in an internal storage area in advance.

The time update unit 41 sets the initial value of the sampling time k to "1" and outputs the sampling time (k=1) of the initial value to the prior state estimate update unit 42a (step Sa1).

When the sampling time k is received from the time update unit 41, the prior state estimate update unit 42a reads a vector ˆω(k−1) which is a posterior state estimate from the first database unit 31a on the basis of the received sampling time k. The prior state estimate update unit 42 performs operation of formula (47) on the basis of the read vector ˆω(k−1) which is the posterior state estimate and the matrix M stored in the internal storage area to calculate a vector ˆω⁻(k) which is a prior state estimate. The prior state estimate update unit 42a writes the calculated vector ˆω⁻(k) which is the prior state estimate in the first database unit 31a to update it. When a vector ˆω⁻(k−1) at the sampling time k−1 has been written in the first database unit 31a, the prior state estimate update unit 42a deletes the vector ˆω⁻(k−1) and writes the vector ˆω⁻(k) to update it. The prior state estimate update unit 42a outputs the sampling time k to the prior error covariance update unit 43a (step Sa2).

When the sampling time k is received from the prior state estimate update unit 42a, the prior error covariance update unit 43 reads the system noise covariance matrix $Q_f$ from the second database unit 32a on the basis of the received sampling time k. The prior error covariance update unit 43a reads the posterior error covariance matrix $P_f(k-1)$ from the first database unit 31a. The prior error covariance update unit 43a performs operation of formula (48) on the basis of the read system noise covariance matrix $Q_f$, posterior error covariance matrix $P_f(k-1)$, and the matrix M stored in the internal storage area to calculate a prior error covariance matrix $P_f^-(k)$. The prior error covariance update unit 43a writes the calculated prior error covariance matrix $P_f^-(k)$ in the first database unit 31a to update it. When a prior error covariance matrix $P_f^-(k-1)$ at the sampling time k−1 has been written in the first database unit 31a, the prior error covariance update unit 43a deletes the prior error covariance matrix $P_f^-(k-1)$ and writes the prior error covariance matrix $P_f^-(k)$ to update it. The prior error covariance update unit 43a outputs the sampling time k to the prior output signal calculation unit 44a (step Sa3).

When the sampling time k is received from the prior error covariance update unit 43a, the prior output signal calculation unit 44a reads the vector ˆω⁻(k) which is the prior state estimate from the first database unit 31a on the basis of the received sampling time k. The prior output signal calculation unit 44a reads a weight matrix W(k) and a reception signal vector y(k) from the third database unit 33a. The prior output signal calculation unit 44a performs operation of formula (36) on the basis of a vector ˆφ⁻(k) included in the read vector ˆω⁻(k) which is the prior state estimate, the weight matrix W(k), and the reception signal vector y(k) to calculate a vector ˆx⁻(k) which is a prior output signal.

The prior output signal calculation unit 44a calculates the matrix T(k) represented by formulas (26) and (27) on the basis of the calculated vector ˆx⁻(k) which is the prior output signal, the vector ˆω⁻(k) which is the prior state estimate, the weight matrix W(k), and the reception signal vector y(k). The prior output signal calculation unit 44a calculates the matrix $T_f(k)$ represented by formulas (51) and (52) on the basis of the calculated matrix T(k). The prior output signal calculation unit 44a writes the calculated vector ˆx⁻(k) which is the prior output signal in the third database unit 33a to update it. When a vector ˆx⁻(k−1) at the sampling time k−1 has been written in the third database unit 33a, the prior output signal calculation unit 44a deletes the vector ˆx⁻(k−1) and writes the vector ˆx⁻(k) to update it. The prior output signal calculation unit 44a outputs the calculated matrix $T_f(k)$ and the sampling time k to the auxiliary matrix calculation unit 45a (step Sa4).

The auxiliary matrix calculation unit 45a fetches the matrix $T_f(k)$ output by the prior output signal calculation unit 44a. The auxiliary matrix calculation unit 45a reads the prior error covariance matrix $P_f^-(k)$ from the first database unit 31a on the basis of the sampling time k received from the prior output signal calculation unit 44a. The auxiliary matrix calculation unit 45a reads the observation noise covariance matrix R from the second database unit 32a. The auxiliary matrix calculation unit 45 performs operations of formulas (56), (57), and (58) on the basis of the read prior error covariance matrix $P_f^-(k)$ and the observation noise covariance matrix R to calculate auxiliary matrices A(k), B(k), and C(k).

The auxiliary matrix calculation unit 45a writes the calculated auxiliary matrices A(k), B(k), and C(k) in the third database unit 33a to update it. When auxiliary matrices A(k−1), B(k−1), and C(k−1) at the sampling time k−1 have been written in the third database unit 33a, the auxiliary matrix calculation unit 45a deletes the auxiliary matrices A(k−1), B(k−1), and C(k−1) and writes the auxiliary matrices A(k), B(k), and C(k) to update them. The auxiliary matrix calculation unit 45a outputs the sampling time k to the Kalman gain update unit 46a (step Sa5).

When the sampling time k is received from the auxiliary matrix calculation unit 45a, the Kalman gain update unit 46a reads the auxiliary matrices A(k) and C(k) from the third database unit 33a on the basis of the received sampling time k. The Kalman gain update unit 46a performs operation of formula (59) on the basis of the read auxiliary matrices A(k) and C(k) to calculate a Kalman gain matrix $G_f(k)$. The Kalman gain update unit 46a writes the calculated Kalman gain matrix $G_f(k)$ in the third database unit 33a to update it. When a Kalman gain matrix $G_f(k-1)$ at the sampling time k−1 has been written in the third database unit 33a, the Kalman gain update unit 46a deletes the Kalman gain matrix $G_f(k-1)$ and writes the Kalman gain matrix $G_f(k)$ to update it. The Kalman gain update unit 46a outputs the sampling time k to the posterior state estimate update unit 47a (step Sa6).

When the sampling time k is received from the Kalman gain update unit 46a, the posterior state estimate update unit 47a reads the Kalman gain matrix $G_f(k)$ and the vector ˆx⁻(k) which is the prior output signal from the third database unit 33a on the basis of the received sampling time k. The posterior state estimate update unit 47a reads the vector ˆω⁻(k) which is the prior state estimate from the first database unit 31a. The posterior state estimate update unit 47a calculates a provisional determination value vector $x_{HD}(k)$ by performing provisional determination according to a predetermined signal modulation method on the vector ˆx⁻(k) which is the prior output signal.

The posterior state estimate update unit 47a performs operation of formula (53) on the basis of the calculated provisional determination value vector $x_{HD}(k)$, the read vector ˆω⁻(k) which is the prior state estimate, the Kalman gain matrix $G_f(k)$, and the vector ˆx⁻(k) which is the prior output signal to calculate a vector ˆω(k) which is a posterior state estimate. The posterior state estimate update unit 47a writes the calculated vector ˆω(k) which is the posterior state estimate in the first database unit 31a to update it. When a vector ˆω(k−1) at the sampling time k−1 has been written in the first database unit 31a, the posterior state estimate update unit 47a deletes the vector ˆω(k−1) and writes the vector ˆω(k) to update it. The posterior state estimate update unit 47a outputs the sampling time k to the posterior error covariance update unit 48a (step Sa7).

When the sampling time k is received from the posterior state estimate update unit 47a, the posterior error covariance update unit 48a reads the Kalman gain matrix $G_f(k)$ and the auxiliary matrix A(k) from the third database unit 33a on the basis of the received sampling time k. The posterior error covariance update unit 48a reads the posterior error covariance matrix $P_f^-(k)$ from the first database unit 31a. The posterior error covariance update unit 48a performs operation of formula (60) on the basis of the read Kalman gain matrix $G_f(k)$, auxiliary matrix A(k), and prior error covariance matrix $P_f^-(k)$ to calculate a posterior error covariance matrix $P_f(k)$. The posterior error covariance update unit 48 writes the calculated posterior error covariance matrix $P_f(k)$ in the first database unit 31a to update it. When a posterior error covariance matrix $P_f(k-1)$ at the sampling time k−1 has been written in the first database unit 31a, the posterior error covariance update unit 48a deletes the posterior error covariance matrix $P_f(k-1)$ and writes the posterior error covariance matrix $P_f(k)$ to update it. The posterior error covariance update unit 48a outputs the sampling time k to the output signal calculation unit 49 (step Sa9).

When the sampling time k is received from the posterior error covariance update unit 48a, the output signal calculation unit 49a reads the vector ˆω(k) which is the posterior state estimate from the first database unit 31a on the basis of the received sampling time k. The output signal calculation unit 49a performs operation of formula (55) on the basis of the read vector ˆω(k) which is the posterior state estimate to calculate a vector ˆx(k) which is an estimated sequence of the transmission signal vector x, and outputs a first data estimation sequence, a second data estimation sequence, . . . , an Nt-th data estimation sequence which are elements of the calculated vector ˆx(k) to the outside.

The output signal calculation unit 49a refers to the third database unit 33a and determines whether or not the third database unit 33a stores a reception signal vector y(k+1) corresponding to a sampling time k+1 obtained by adding 1 to the current sampling time k (step Sa10). The output signal calculation unit 49a outputs the sampling time k to the time update unit 41 when it is determined that the third database unit 33 stores the reception signal vector y(k+1) corresponding to the sampling time k+1 (Yes in step Sa10). The time update unit 41 sets a value obtained by adding 1 to the sampling time k as a new sampling time k and outputs the new sampling time k to the prior state estimate update unit 42a (step Sa11). Thereafter, processing of step S12 and following are executed.

On the other hand, when it is determined that the third database unit 33a does not store the reception signal vector y(k+1) corresponding to the sampling time k+1 (No in step Sa10), the output signal calculation unit 49a ends processing.

In the second embodiment described above, interference components to be excluded further include a frequency offset component caused by frequency fluctuation of the light source of each of the plurality of carrier generation units 13-1 to 13-Nt and the plurality of local oscillation units 23-1 to 23-Nt in addition to a phase noise component caused by phase fluctuation of the light source of each of the plurality of carrier generation units 13-1 to 13-Nt and the plurality of local oscillation units 23-1 to 23-Nt, which is an interference component of the first embodiment. Accordingly, it is possible to remove the frequency offset component caused by frequency fluctuation of the light source of each of the plurality of carrier generation units 13-1 to 13-Nt and the plurality of local oscillation units 23-1 to 23-Nt along with the phase noise component caused by phase fluctuation of the light source of each of the plurality of carrier generation units 13-1 to 13-Nt and plurality of local oscillation units 23-1 to 23-Nt. Therefore, in coherent transmission for transmitting a plurality of signals in a plurality of modes of the same transmission medium, it is possible to apply an asynchronous light source as the light source included in each of the carrier generation units 13-1 to 13-Nt of the transmission device 1 and the light source included in each of the local oscillation units 23-1 to 23-Nr of the reception device 2. In other words, a plurality of signals can be transmitted in a plurality of modes of the same transmission medium in a state in which carriers generated by the transmission device 1 and local oscillation signals generated by the reception device 2a are asynchronous. Furthermore, since the frequency offset component caused by frequency fluctuation of the light source included in each of the plurality of carrier generation units 13-1 to 13-Nt and the plurality of local oscillation units 23-1 to 23-Nt is removed in the communication system 100a of the second embodiment, an estimated sequence of a transmission signal vector can be estimated with higher accuracy than the first communication system 100.

In the first and second embodiments described above, a vector having Nr reception data sequences which are subjected to digital signal processing performed by the digital signal processing unit 25 and output therefrom as elements is used as the reception signal vector y. On the other hand, the weight matrix calculation unit 26 may directly fetch the Nr reception data sequences output by the reception processing units 22-1 to 22-Nr without the digital signal processing unit 25. In this case, the Nr reception data sequences output by the reception processing units 22-1 to 22-Nr become the reception signal vector y.

Third Embodiment

In the first and second embodiments, the Kalman gain update units 46 and 46a use the provisional determination value vector $x_{HD}(k)$ obtained by performing provisional determination according to a predetermined signal modulation method on the prior signal estimate vector ˆx⁻(k) in formula (28) and formula (53). Therefore, depending on the accuracy of the prior signal estimate vector ˆx⁻(k), the provisional determination value vector $x_{HD}(k)$ may contain error, deteriorating carrier phase recovery performance. In the third embodiment, a configuration in which carrier phase recovery performance is prevented from being deteriorated using a predetermined pilot symbol instead of the provisional determination value vector $x_{HD}(k)$ is provided.

Figure 9:
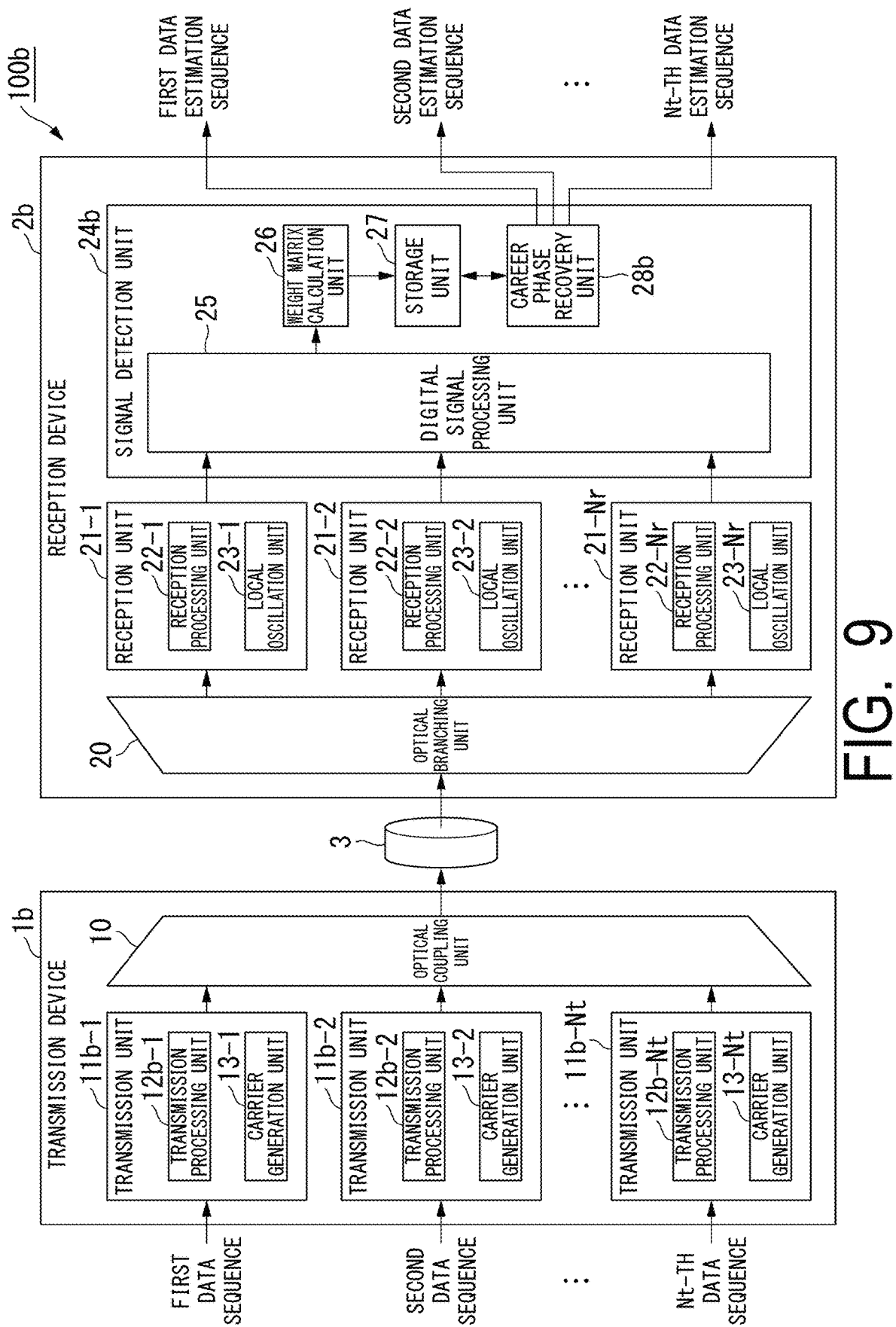
FIG. 9 is a block diagram showing a configuration of a communication system of a third embodiment.

FIG. 9 is a block diagram showing a configuration of a communication system 100b according to the third embodiment. In the third embodiment, identical configurations to the first embodiment have been allocated identical reference symbols, and only different configurations will be described below. The communication system 100b includes a transmission device 1b, a transmission line 3, and a reception device 2b. The transmission device 1b includes transmission units 11b-1 to 11b-Nt and an optical coupling unit 10. The transmission unit 11b-1 includes a transmission processing unit 12b-1 and a carrier generation unit 13-1, and similarly, the transmission units 11b-12 to 11b-Nt respectively include transmission processing units 12b-2 to 12b-Nt and carrier generation units 13-2 to 13-Nt corresponding to the branch numbers of the reference signs.

The transmission processing units 12b-1 to 12b-Nt periodically insert a predetermined pilot symbol such as a head of a signal frame generated from a first data sequence to an Nt-th data sequence fetched by each thereof in addition to the components included in the transmission processing units 12-1 to 12-Nt of the first embodiment.

The reception device 2b includes an optical branching unit 20, reception units 21-1 to 21-Nr, and a signal detection unit 24b. The signal detection unit 24b includes a digital signal processing unit 25, a weight matrix calculation unit 26, a storage unit 27, and a carrier phase recovery unit 28b.

Figure 10:
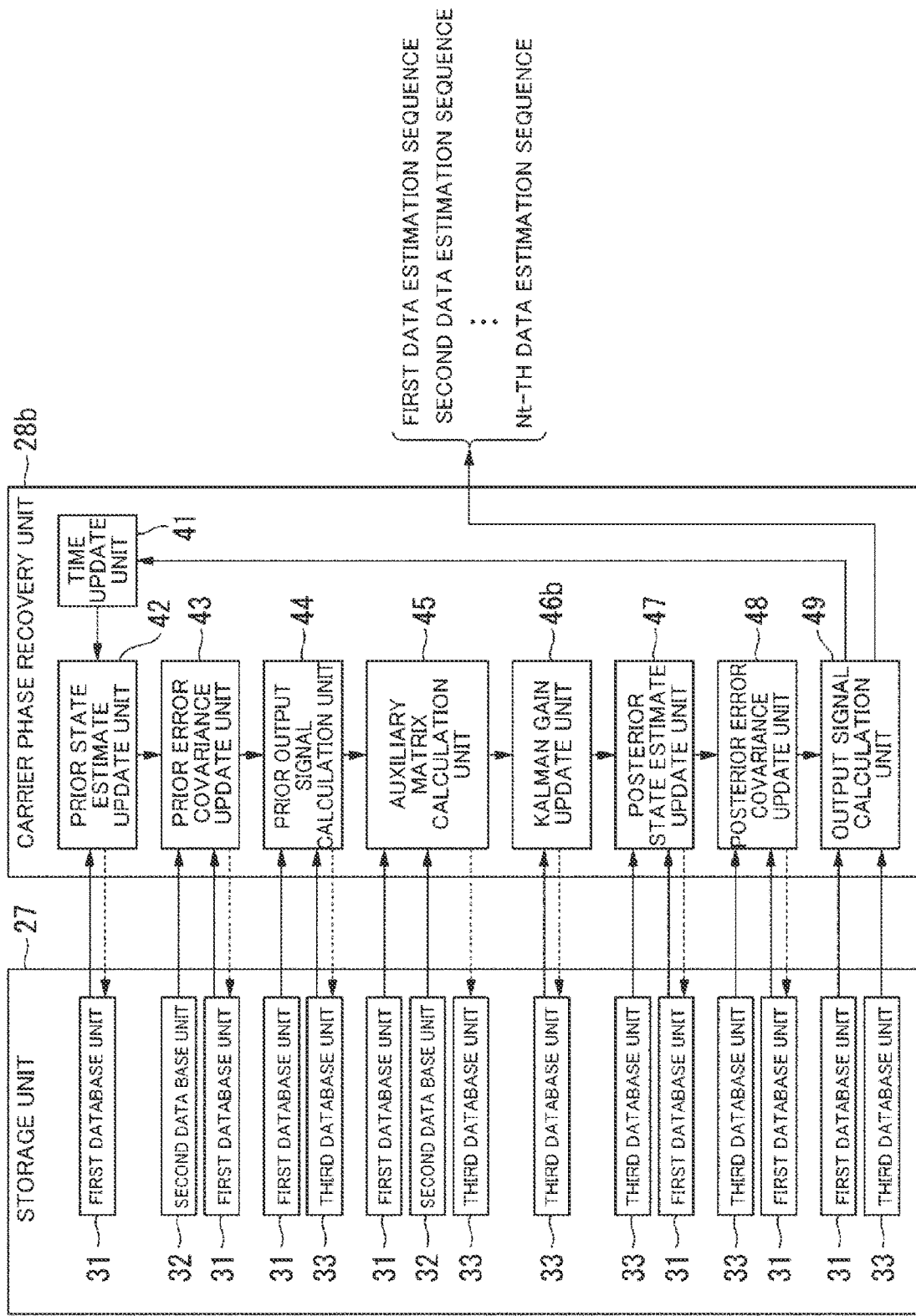
FIG. 10 is a block diagram showing an internal configuration of a carrier phase recovery unit of the third embodiment and which of the first database unit, the second database unit, and the third database unit included in the storage unit is used by each functional unit included in the carrier phase recovery unit.

The carrier phase recovery unit 28b has the same configuration as the carrier phase recovery unit 28 of the first embodiment except that it includes a Kalman gain update unit 46b instead of the Kalman gain update unit 46 included in the carrier phase recovery unit 28 of the first embodiment, as shown in FIG. 10.

The carrier phase recovery unit 28b stores the predetermined pilot symbol inserted by the transmission device 1b and a period in which the pilot symbol is inserted in an internal storage area in advance. Here, the pilot symbol is a vector including Nt data sequences, similarly to the transmission signal vector x.

The Kalman gain update unit 46b performs calculation using the pilot symbol stored in the internal storage area in advance instead of the provisional determination value vector $x_{HD}(k)$ in a part of calculation of formula (28), that is, operation of formula (28) performed at a timing of the sampling time k at which the pilot symbol periodically inserted by the transmission processing units 12b-1 to 12b-Nt is included in a reception signal vector y(k).

Accordingly, since a part of the provisional determination value vector $x_{HD}(k)$ is replaced with the pilot symbol known in the transmission device 1b and the reception device 2b and calculation is performed in the third embodiment, carrier phase recovery performance can be prevented from being deteriorated even when the accuracy of the prior signal estimate vector $\hat{x}^-(k)$ is low.

Although the configuration of the third embodiment is obtained by adding the configuration in which the pilot symbol is used to the first embodiment, the configuration in which the pilot symbol is used can also be added to the communication system 100a of the second embodiment, and accordingly, the pilot symbol can be applied instead of a part of the provisional determination value vector $x_{HD}(k)$ in operation of formula (53), and carrier phase recovery performance can be prevented from being deteriorated even when the accuracy of the prior signal estimate vector $\hat{x}^-(k)$ is low.

In the third embodiment, the transmission processing units 12b-1 to 12b-Nt periodically inserts the predetermined pilot symbol such as a head of a signal frame. On the other hand, the pilot symbols may be periodically inserted for every several hundred symbols, or pilot symbol insertion intervals may be adaptively and variably changed in accordance with a communication situation. However, when the pilot symbol insertion intervals are variable, a means for notifying the Kalman gain update unit 46b of the carrier phase recovery unit 28b of the reception device 2b of a pilot symbol insertion timing is required. As the pilot symbol of the third embodiment, the weight matrix calculation unit 26 may use a pilot symbol for weight matrix calculation used to calculate the weight matrix W in the first and second embodiments.

At the time of performing operation of formula (28) at a timing at which the transmission device 1b transmits the pilot symbol according to the above-described configuration of the third embodiment, the vector $\hat{\varphi}(k)$ which is the posterior state estimate can be calculated using the pilot symbol stored in advance in the reception device 2b instead of the vector $x_{HD}(k)$. Therefore, even when the accuracy of the vector $\hat{x}^-(k)$ which is the prior signal estimate is low, it is possible to prevent carrier phase recovery performance from being deteriorated, and it is possible to calculate an estimated sequence of a transmission data sequence from which interference components have been removed with higher accuracy as compared to the configuration of the first and second embodiments.

(Simulation Results)

Figure 11:
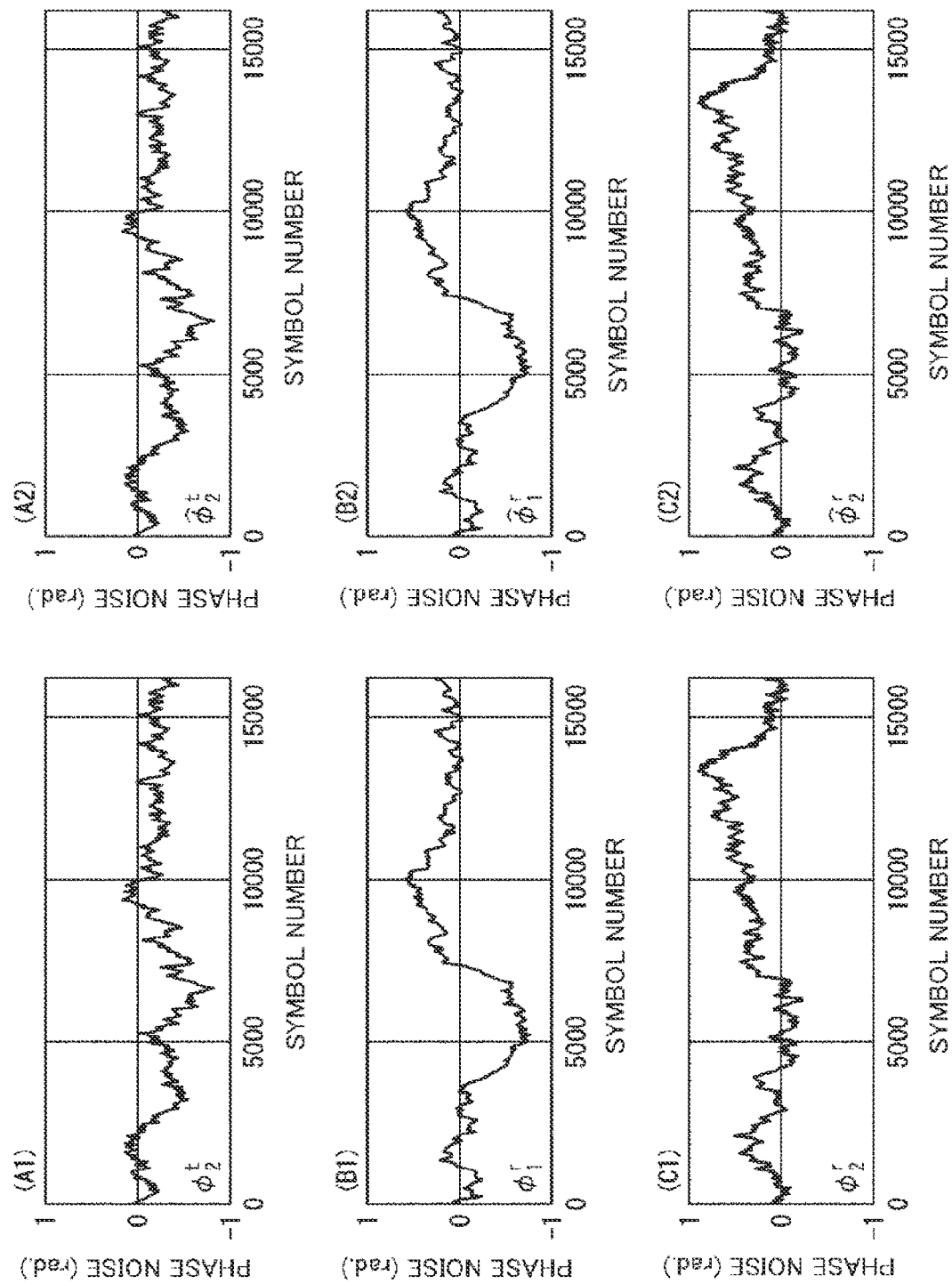
FIG. 11 is a diagram (1) showing a graph of simulation results.

FIG. 11 is graphs showing results of simulations of mode multiplex transmission performed by applying the communication system 100 of the first embodiment, in which Nt=Nr=2, to transmission of two independent transmission data sequences. The transmission processing units 12-1 and 12-2 of the transmission units 11-1 and 11-2 of the transmission device 1 modulate a bit string of a first data sequence and a bit string of a second data sequence which are two independent transmission data sequences fetched thereby as 16QAM (Quadrature Amplitude Modulation) signals with a signal modulation rate of 10 GBaud to generate optical signals. The optical coupling unit 10 couples the two optical signals generated by the transmission processing units 12-1 and 12-2 and transmits the coupled signals to the transmission line 3. In the transmission line 3, the optical signals corresponding to the two independent transmission data sequences are mixed with equal power.

In the simulations, it is assumed that a signal-to-noise ratio γ after propagation through the transmission line 3 is 17 dB. It is assumed that the line width of the two carrier generation units 13-1 and 13-2 included in the transmission device 1 and the two local oscillation units 23-1 and 23-2 included in the reception device 2 is 100 kHz. Further, a phase $\varphi_1^t$ in a digital signal stage caused by the carrier generation unit 13-1 used to modulate the first data sequence is set as a reference angle such that $\varphi_1^t=0$.

In the six graphs shown in FIG. 11, the horizontal axis indicates symbol numbers and the vertical axis indicates phase noise. The unit of phase noise is "rad." In FIG. 11, graphs (A1), (B1), and (C1) in the left column show the amounts of phase noise actually generated in the carrier generation unit 13-2, the local oscillation unit 23-1, and the local oscillation unit 23-2. On the other hand, graphs (A2), (B2), and (C2) in the right column show the amounts of phase noise estimated by the carrier phase recovery unit 28 with respect to the carrier generation unit 13-2, the local oscillation unit 23-1, and the local oscillation unit 23-2. As can be ascertained from comparison between graphs (A1) and (A2) corresponding to the carrier generation unit 13-2, graphs (B1) and (B2) corresponding to the local oscillation unit 23-1, and graphs (C1) and (C2) corresponding to the local oscillation unit 23-2 (C1), the carrier phase recovery unit 28 can estimate the amount of phase noise for each symbol caused by the carrier generation unit 13-2, the local oscillation unit 23-1, and the local oscillation unit 23-2, that is, at each sampling time with high accuracy.

Figure 12:
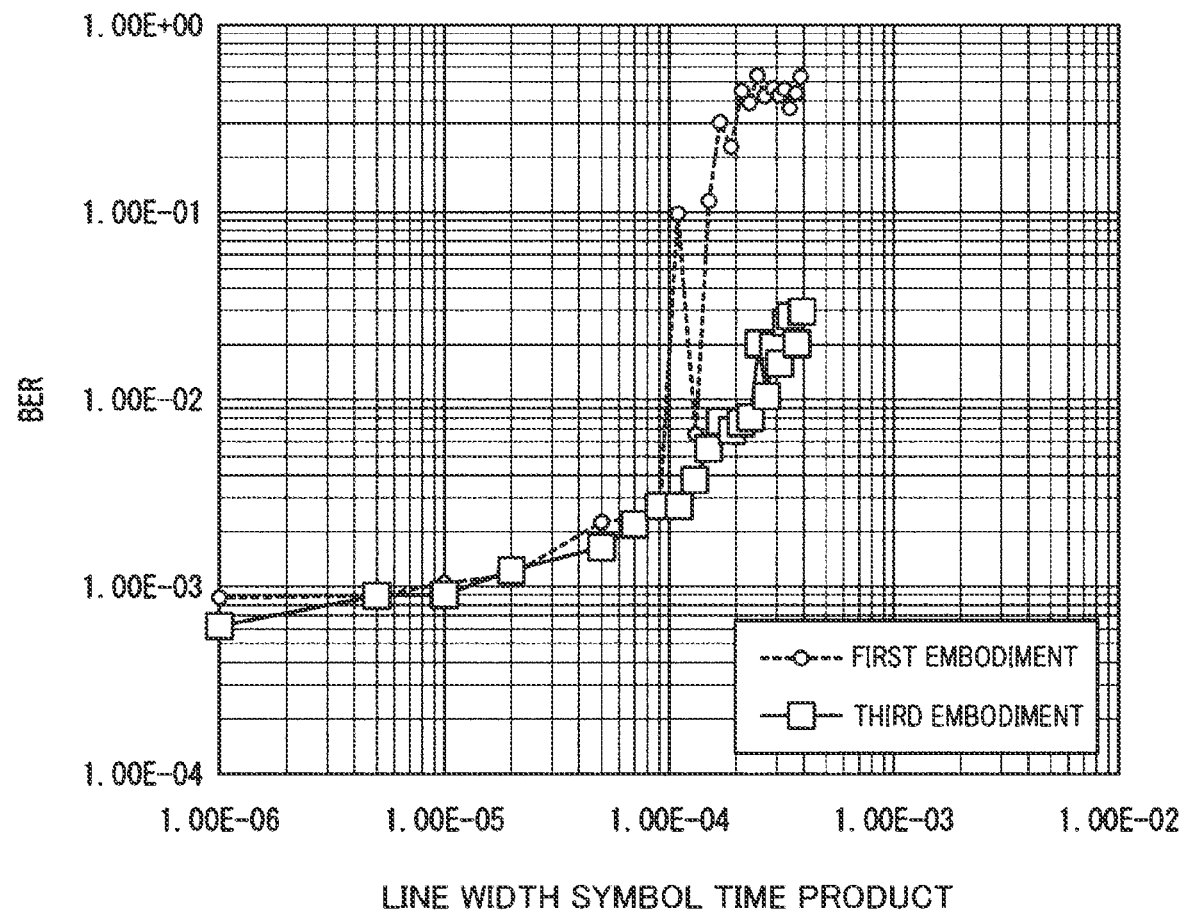
FIG. 12 is a diagram (2) showing a graph of simulation results.

FIG. 12 is a graph showing results when phase noise was estimated by changing the line widths of the light sources of the carrier generation units 13-1 and 13-2 and the local oscillation units 23-1 and 23-2 in the communication system 100 of the first embodiment and the communication system 100b of the third embodiment under the above-described simulation conditions. In the graph shown in FIG. 12, the vertical axis represents a bit error rate (BER) and the horizontal axis represents a line width symbol time product. The line width symbol time product corresponds to the light source line width of 1 MHz, for example, when the value of the line width symbol time product is $10^{-4}$. In the communication system 100b of the third embodiment, the transmission processing units 12b-1 and 12b-2 inserts a pilot symbol once every 10 symbols.

As can be ascertained from the graph of FIG. 12, the carrier phase recovery unit 28 of the communication system 100 of the first embodiment can estimate phase noise up to a line width symbol time product of about $10^{-4}$ with high accuracy. On the other hand, it can be ascertained that the carrier phase recovery unit 28b of the communication system 100b of the third embodiment can estimate phase noise with a BER lower than that of the carrier phase recovery unit 28 of the first embodiment even if the line width symbol time product becomes greater than $10^{-4}$ due to insertion of the pilot symbol.

In the first and second embodiments, the weight matrix calculation unit 26 calculates a new weight matrix W using, for example, a pilot symbol for weight matrix calculation. On the other hand, in the case of the first embodiment, the output signal calculation unit 49 of the carrier phase recovery unit 28 may feed back the vector ^x(k) calculated on the basis of formula (30) to the weight matrix calculation unit 26, and the weight matrix calculation unit 26 may calculate a new weight matrix W on the basis of the fed back vector ^x(k). In the case of the second embodiment, the output signal calculation unit 49a of the carrier phase recovery unit 28a may feed back the vector ^x(k) calculated on the basis of formula (55) to the weight matrix calculation unit 26, and the weight matrix calculation unit 26 may calculate a new weight matrix W on the basis of the fed back vector ^x(k).

Although the communication systems 100, 100a, and 100b of the first to third embodiments aim at a spatial multiplex optical transmission system, the configurations shown in the first to third embodiments are not limited to the spatial multiplex optical transmission system and can be applied to removal of interference components superimposed on a plurality of signals when MIMO type signal processing is performed in all communication systems such as wireless communication system, satellite communication systems, magnetic recording media, and inter-chip communication. In the case of a communication system in which transmission is performed by radio, the transmission line 3 corresponds to a space in which radio waves propagate. The carrier generation units 13-1 to 13-Nt generate carriers of electrical signals that become carriers of radio waves, and the transmission processing units 12-1 to 12-Nt and 12b-1 to 12b-Nt modulate a transmission data sequences using the carriers of the electric signals. The transmission devices 1 and 1b perform transmission through a plurality of transmission antennas connected to each of the transmission processing units 12-1 to 12-Nt and 12b-1 to 12b-Nt without including the optical coupling unit 10. The local oscillation units 23-1 to 23-Nt generate local oscillation waves of electrical signals to be used for demodulation. The reception device 2, 2a, and 2b receive radio signals using a plurality of reception antennas connected to each of the reception processing units 22-1 to 22-Nr and demodulate the received radio signals by local oscillation waves of electrical signals without including the optical branching unit 20.

The signal detection units 24, 24a, and 24b in the first to third embodiments may be configured as a signal detection device which is a single device, the configured signal detection device may be included in the reception devices 2, 2a, and 2b, the carrier phase recovery units 28, 28a, and 28b in the first to third embodiments may be configured as a carrier phase recovery device which is a single device, and the configured carrier phase recovery apparatus may be included in the signal detection units 24, 24a, and 24b.

When the signal detection units 24, 24a, and 24b are configured as a signal detection device which is a single device, the signal detection device may be realized by a computer and a program. When the carrier phase recovery units 28, 28a, and 28b in the first to third embodiments are configured as a carrier phase recovery device which is a single device, the carrier phase recovery device may be realized by a computer and a program. In such a case, the devices may be realized by recording these programs in a computer-readable recording medium and causing a computer to read and execute the programs. Further, these programs may be provided through a network such as the Internet. The term "computer" as used herein is assumed to include an OS and hardware such as peripheral devices. The "computer-readable recording medium" refers to a portable medium such as a flexible disk, an optical magnetic disk, a ROM, and a CD-ROM, and other storage devices such as a hard disk which are built in a computer system. In addition, the "computer-readable recording medium" may also include a recording medium that dynamically retains a program for a short period of time, for example, a communication line used to transmit the program via a network (e.g. Internet) or other communication lines (e.g. telephone line); and a recording medium that retains the program for a certain period of time, for example, a server or a volatile memory installed within the computer system that serves as a client in that case. Moreover, the program described above may be any of a program for realizing some of the functions described above, a program capable of realizing the functions described above in combination with a program already recorded in a computer system, and a program for realizing the functions using a programmable logic device such as an FPGA (Field Programmable Gate Array).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention can be applied to a communication system that performs MIMO type communication processing.

REFERENCE SIGNS LIST

100 Communication system
1 Transmission device
2 Reception device
3 Transmission line
10 Optical coupling unit, 11-1 to 11-Nt Transmission unit, 12-1 to 12-Nt Transmission processing unit, 13-1 to 13-Nt Carrier generation unit Optical branching unit, 21-1 to 21-Nr Reception unit, 22-1 to 22-Nr Reception processing unit, 23-1 to 23-Nr Local oscillation unit
24 Signal detection unit
Digital signal processing unit
26 Weight matrix calculation unit
27 Storage unit
28 Carrier phase recovery unit

The invention claimed is:

1. A signal detection device included in a reception device in a communication system including: a transmission device including a plurality of transmitters that modulate carriers output by carrier generators included in the transmitters on the basis of transmission data sequences provided to the transmitters to generate transmission signals, and transmit the generated transmission signals to a transmission line for transmitting a plurality of signals; and the reception device including a plurality of receptors that receive the plurality of signals transmitted through the transmission line and demodulate the received reception signals on the basis of local oscillation signals output by local oscillators included in the receptors to generate reception data sequences, the signal detection device comprising:
 a weight matrix calculator configured to calculate a weight matrix used at a time of performing MIMO linear reception on the reception data sequences; and
 a carrier phase recoverer configured to apply a Kalman filter algorithm to a predetermined state equation and a predetermined observation equation to calculate a posterior state estimate of an interference component, and based on a calculated the posterior state estimate, calculates an estimated sequences of the transmission data sequences with the interference component removed,
 wherein the predetermined state equation is an equation that calculates posterior state information on a basis of prior state information, state information being the interference component generated because the plurality of carrier generators and the plurality of local oscillators are asynchronous,
 wherein the predetermined observation equation is an equation that calculates an observation information in a state indicated by the posterior state information on the basis of the posterior state information calculated by the state equation, the reception data sequences, and the weight matrix, the observation information being transmission data sequences.

2. The signal detection device according to claim 1,
 wherein the interference component is a component including a first phase noise component caused by phase fluctuations of the plurality of carrier generators and a second phase noise component caused by phase fluctuations of the plurality of local oscillators.

3. The signal detection device according to claim 2,
 wherein the interference component is a component including a first frequency offset component caused by frequency fluctuations of the plurality of carrier generators and a second frequency offset component caused by frequency fluctuations of the plurality of local oscillators in addition to the first phase noise component and the second phase noise component.

4. The signal detection device according to claim 1,
 wherein, at the time of updating the posterior state estimation value of the interference component, the carrier phase recoverer calculates the posterior state estimate calculated on the basis of the observation information calculated on the basis of the observation equation and provisional determination values of the transmission data sequences obtained by provisionally determining the observation information, or calculates the posterior state estimate on the basis of a pilot symbol transmitted by the transmission device, and the observation information calculated on the basis of the observation equation.

5. A carrier phase recovery apparatus included in a communication system including: a transmission device including a plurality of transmitters that modulate carriers output by carrier generators included in the transmitters on the basis of transmission data sequences provided to the transmitter to generate transmission signals, and transmit the generated transmission signals to a transmission line for transmitting a plurality of signals; and the reception device including a plurality of receptors that receive the plurality of signals transmitted through the transmission line and demodulate the received reception signals on the basis of local oscillation signals output by local oscillators included in the receptors to generate reception data sequences, the carrier phase recovery apparatus comprising:
 a first calculator configured to apply a Kalman filter algorithm to a predetermined state equation and a predetermined observation equation to calculate a posterior state estimate of an interference component, and based on a calculated the posterior state estimate, calculates an estimated sequences of the transmission data sequences with the interference component removed,
 wherein the predetermined state equation is an equation that calculates posterior state information on a basis of prior state information, state information being the interference component generated because the plurality of carrier generators and the plurality of local oscillators are asynchronous,
 wherein the predetermined observation equation is an equation that calculates an observation information in a state indicated by the posterior state information on the basis of the posterior state information calculated by the state equation, the reception data sequences, and a weight matrix used at a time of performing MIMO linear reception on the reception data sequences, to calculate a posterior state estimate of the interference component, the observation information being transmission data sequences,
 a second calculator configured to calculate estimated sequences of the transmission data sequences from which the interference component has been removed on the basis of the calculated posterior state estimate.

6. A carrier phase recovery method performed by a reception device in a communication system including: a transmission device including a plurality of transmitters that modulate carriers output by carrier generators included in the transmitters on the basis of transmission data sequences provided to the transmitters to generate transmission signals, and transmit the generated transmission signals to a transmission line for transmitting a plurality of signals; and the reception device including a plurality of receptors that receive the plurality of signals transmitted through the transmission line and demodulate the received reception signals on the basis of local oscillation signals output by local oscillators included in the receptors to generate reception data sequences, the carrier phase recovery method comprising:
 calculating a weight matrix used at a time of performing MIMO linear reception on the received data sequences;

appling a Kalman filter algorithm to a predetermined state equation and a predetermined observation equation to calculate a posterior state estimate of an interference component, and calculating an estimated sequences of the transmission data sequences with the interference component removed based on a calculated the posterior state estimate, wherein the predetermined state equation is an equation that calculates posterior state information on a basis of prior state information, state information being the interference component generated because the plurality of carrier generators and the plurality of local oscillators are asynchronous, wherein the predetermined observation equation is an equation that calculates an observation information in a state indicated by the posterior state information on the basis of the posterior state information calculated by the state equation, the reception data sequences, and the weight matrix, the observation information being transmission data sequences.

\* \* \* \* \*